United States Patent
Endo et al.

(10) Patent No.: US 10,645,788 B2
(45) Date of Patent: May 5, 2020

(54) X-RAY GENERATION DEVICE, X-RAY DEVICE, AND METHOD FOR MANUFACTURING STRUCTURE

(71) Applicant: NIKON CORPORATION, Tokyo (JP)

(72) Inventors: Takeshi Endo, Yokohama (JP); Satoshi Miura, Yokohama (JP)

(73) Assignee: Nikon Corporation, Tokyo (JP)

( * ) Notice: Subject to any disclaimer, the term of this patent is extended or adjusted under 35 U.S.C. 154(b) by 285 days.

(21) Appl. No.: 15/129,677

(22) PCT Filed: Mar. 27, 2014

(86) PCT No.: PCT/JP2014/058883
§ 371 (c)(1),
(2) Date: Sep. 27, 2016

(87) PCT Pub. No.: WO2015/145668
PCT Pub. Date: Oct. 1, 2015

(65) Prior Publication Data
US 2017/0150589 A1    May 25, 2017

(51) Int. Cl.
*H05G 1/10* (2006.01)
*H05G 1/32* (2006.01)
(Continued)

(52) U.S. Cl.
CPC .............. *H05G 1/32* (2013.01); *G01N 23/04* (2013.01); *G05B 19/4097* (2013.01);
(Continued)

(58) Field of Classification Search
CPC ...... H01H 13/023; H01H 13/04; H01H 13/50; H01H 13/52; H01H 2231/026;
(Continued)

(56) References Cited

U.S. PATENT DOCUMENTS

| | | | |
|---|---|---|---|
| 4,216,382 A | 8/1980 | Franke | |
| 4,967,333 A * | 10/1990 | Callier | H02M 3/28 363/17 |

(Continued)

FOREIGN PATENT DOCUMENTS

| | | |
|---|---|---|
| GB | 1 357 395 | 10/1971 |
| JP | 47-009424 A | 5/1972 |

(Continued)

OTHER PUBLICATIONS

Partial Supplementary European Search Report issued by the European Patent Office dated Oct. 25, 2017 in counterpart International Application No. EP 14887665.9.

(Continued)

*Primary Examiner* — Irakli Kiknadze
(74) *Attorney, Agent, or Firm* — Finnegan, Henderson, Farabow, Garrett & Dunner, L.L.P.

(57) ABSTRACT

An X-ray generation device that emits X-rays due to an electron beam emitted from a cathode arriving at a target, includes: first and second high voltage power supplies that are connected in series between the cathode and the target, and both of which accelerate the electron beam; and wherein the second high voltage power supply outputs a second high voltage so that, with respect to a phase of a ripple component of a first high voltage generated by the first high voltage power supply, a phase of a ripple component of the second high voltage generated by the second high voltage power supply has a predetermined relationship.

28 Claims, 12 Drawing Sheets

(51) Int. Cl.
*G01N 23/04* (2018.01)
*G05B 19/4097* (2006.01)
*H01J 35/14* (2006.01)

(52) U.S. Cl.
CPC .............. *H01J 35/14* (2013.01); *H05G 1/10* (2013.01); *G05B 2219/35134* (2013.01); *G05B 2219/49007* (2013.01)

(58) Field of Classification Search
CPC ... H01H 2300/032; H01H 9/168; H02M 3/28; H02M 3/3155; H02M 7/497; H02M 3/285; H02M 7/103; H02M 3/337; H05G 1/32; H05G 1/10; H05G 1/20; H05G 1/02; H05G 1/025; H05G 1/04; H05G 1/12; H05G 1/50; H05G 1/58; H05G 1/70; H05G 1/18; A61B 6/4014; A61B 6/4233; A61B 6/4283; G01N 23/04; G05B 19/4097; G05B 2219/35134; G05B 2219/49007; H01J 35/14; G05F 1/153
USPC .................. 378/101, 104, 111, 112, 114
See application file for complete search history.

(56) References Cited

U.S. PATENT DOCUMENTS

| | | | | |
|---|---|---|---|---|
| 5,187,737 | A * | 2/1993 | Watanabe | H05G 1/08 363/17 |
| 5,272,612 | A * | 12/1993 | Harada | H02M 3/28 363/26 |
| 5,426,345 | A | 6/1995 | Madsen | |
| 5,594,768 | A * | 1/1997 | Fujii | H05K 13/082 378/21 |
| 6,198,804 | B1 | 3/2001 | Dinsmore | |
| 6,563,717 | B2 * | 5/2003 | Lunding | H02M 3/285 363/15 |
| 6,885,728 | B2 | 4/2005 | Hadland et al. | |
| 8,675,817 | B2 | 3/2014 | Ogata et al. | |
| 2011/0243299 | A1 * | 10/2011 | Sugita | G01N 23/046 378/19 |

FOREIGN PATENT DOCUMENTS

| | | |
|---|---|---|
| JP | 59-099963 | 6/1984 |
| JP | 07-306165 | 11/1995 |
| JP | 10-041093 | 2/1998 |
| JP | 2012-049123 A | 3/2012 |
| JP | 2015-41585 | 3/2015 |
| WO | WO 2007/102947 A1 | 9/2007 |

OTHER PUBLICATIONS

Notification of Reasons for Refusal Office Action issued by the Japanese Patent Office in Japan Application No. 2016-509755, dated Aug. 8, 2017 (7 pages).
Second Office Action issued by the State Intellectual Property Office of P.R. China Patent, dated Feb. 24, 2018, in counterpart Chinese Application No. 201480077101.7.
International Search Report from the Japanese Patent Office for International Application No. PCT/JP2014/058883, dated Apr. 28, 2014.
Partial Supplementary European Search Report issued by the European Patent Office dated Oct. 17, 2017 in counterpart International Application No. EP 14887665.9.
Office Action issued by the China Patent and Trademark Office in corresponding Chinese Application No. 201480077101.7, dated Apr. 19, 2017 (14 pages).
Notification of Reason(s) for Refusal issued by the Japanese Patent Office in Japanese Application No. 2016-509755, dated Dec. 5, 2017.
Supplementary European Search Report issued by the European Patent Office dated Jan. 15, 2018, in counterpart International Application No. EP 14887665.9.
Taiwanese Office Action dated Dec. 7, 2018, issued by the Taiwanese Patent Office in corresponding Application No. 104109517.

* cited by examiner

FIG.4
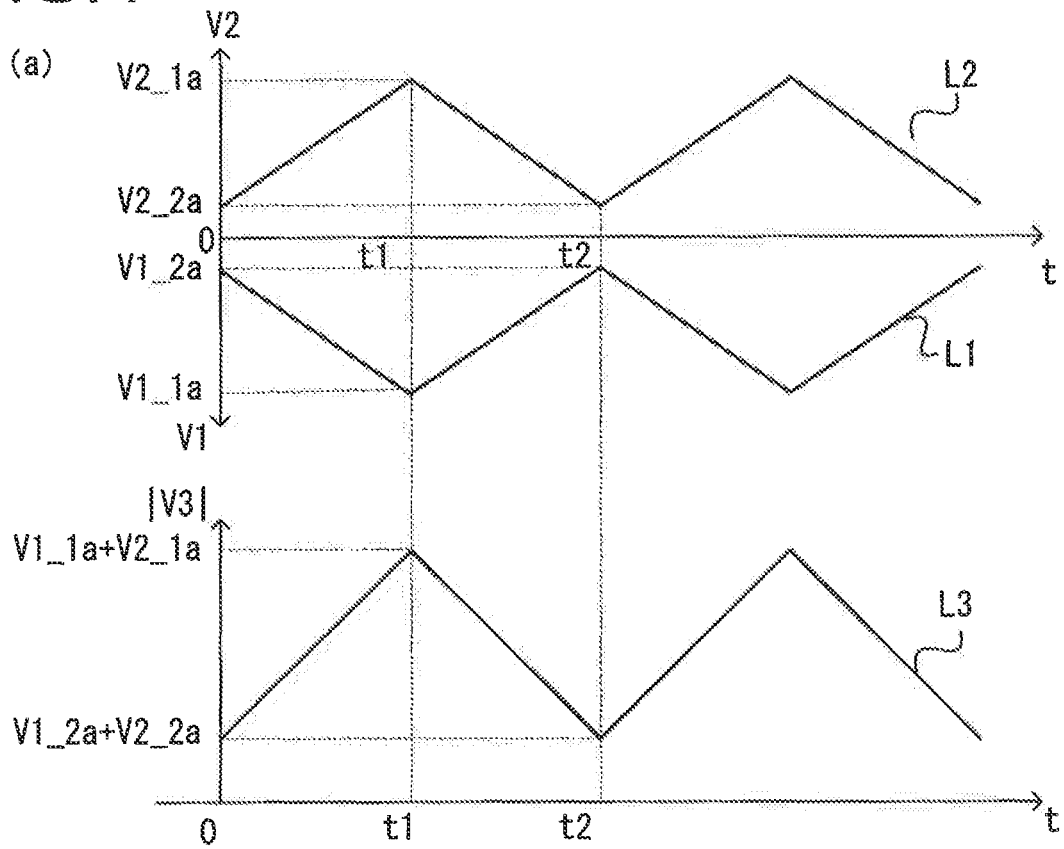
(a)
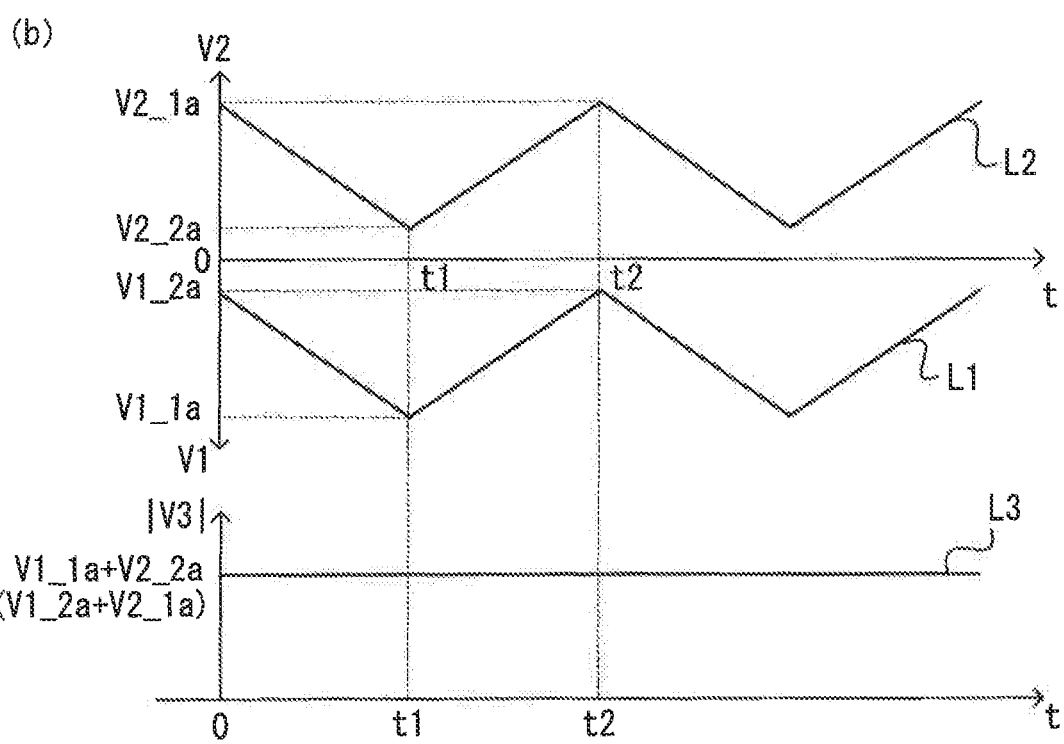
(b)

X-RAY GENERATION DEVICE, X-RAY DEVICE, AND METHOD FOR MANUFACTURING STRUCTURE

TECHNICAL FIELD

The present invention relates to an X-ray generation device, to an X-ray device, and to a method for manufacturing structure.

BACKGROUND ART

From the prior art, an X-ray source has been per se known that generates X-rays by supplying a high voltage between a filament and a target, thus causing an electron beam to be emitted from the filament and to collide with the target (for example, refer to Patent Document #1).

CITATION LIST

Patent Literature

Patent Document #1: Japanese Laid-Open Patent Publication 2004-504710.

SUMMARY OF INVENTION

Technical Problem

However, since irregular variation is generated in the acceleration of the electron beam originating from a high level ripple component present in the high voltage provided by the high voltage power supply, accordingly, if the electron beam is made to converge upon the target by an electron optics system, then the amount of aberration generated by this electron optics system fluctuates. As a result, there is the problem that the size of the spot when the electron beam collides with the target fluctuates, so that the resolution of the projected image decreases and the accuracy of investigation is reduced.

Solution to Technical Problem

According to the 1st aspect of the present invention, an X-ray generation device that emits X-rays due to an electron beam emitted from a cathode arriving at a target, comprises: first and second high voltage power supplies that are connected in series between the cathode and the target, and both of which accelerate the electron beam; and wherein the second high voltage power supply outputs a second high voltage so that, with respect to a phase of a ripple component of a first high voltage generated by the first high voltage power supply, a phase of a ripple component of the second high voltage generated by the second high voltage power supply has a predetermined relationship.

According to the 2nd aspect of the present invention, the X-ray generation device according to the 1st aspect may further comprise a phase setting unit that controls at least one of the first high voltage power supply and the second high voltage power supply, so that the phase of the ripple component of the first high voltage output from the first high voltage power supply and the phase of the ripple component of the second high voltage output from the second high voltage power supply have the predetermined relationship.

According to the 3rd aspect of the present invention, it is preferred that in the X-ray generation device according to the 2nd aspect, a period of the ripple component of the first high voltage and a period of the ripple component of the second high voltage are almost the same; and the phase setting unit controls at least one of the first high voltage power supply and the second high voltage power supply, so that the phase of the ripple component of the first high voltage and the phase of the ripple component of the second high voltage are substantially 180° apart.

According to the 4th aspect of the present invention, it is preferred that in the X-ray generation device according to the 2nd or 3rd aspect, each of the first high voltage power supply and the second high voltage power supply comprises an AC voltage generation unit and a voltage multiplying rectifier circuit that generates the first high voltage or the second high voltage respectively as a predetermined multiple of the voltage output by the respective AC voltage generation unit; and the AC voltage generation units generate AC voltages of predetermined periods based upon control signals output from the phase setting unit.

According to the 5th aspect of the present invention, it is preferred that in the X-ray generation device according to the 4th aspect, each of the voltage multiplying rectifier circuits comprises a plurality of electrostatic capacitor elements.

According to the 6th aspect of the present invention, it is preferred that the X-ray generation device according to any one of the 2nd through 5th aspect further comprises: a first intermediate electrode that is disposed between the cathode and the target; and a second intermediate electrode that is disposed between the first intermediate electrode and the target; and wherein: the first high voltage power supply supplies the first high voltage between the cathode and the first intermediate electrode; and the second high voltage power supply supplies the second high voltage between the first intermediate electrode and the second intermediate electrode.

According to the 7th aspect of the present invention, the X-ray generation device according to the 6th aspect may further comprise an electron beam converging unit that is disposed between the second intermediate electrode and the target.

According to the 8th aspect of the present invention, it is preferred that the X-ray generation device according to any one of the 2nd through 5th aspect further comprises a first intermediate electrode that is disposed between the cathode and the target; and wherein: the first high voltage power supply supplies the first high voltage between the cathode and the first intermediate electrode; and the second high voltage power supply supplies the second high voltage between the first intermediate electrode and the target.

According to the 9th aspect of the present invention, the X-ray generation device according to the 8th aspect may further comprise an electron beam converging unit that is disposed between the first intermediate electrode and the target.

According to the 10th aspect of the present invention, it is preferred that the X-ray generation device according to any one of the 2nd through 9th aspects further comprises an X-ray detection unit that detects X-rays emitted from the target; and wherein the phase setting unit controls at least one of the first high voltage power supply and the second high voltage power supply based upon the detection output of the X-ray detection unit.

According to the 11th aspect of the present invention, an X-ray generation device that emits X-rays due to an electron beam emitted from a cathode arriving at a target, comprises: a first intermediate electrode disposed between the cathode and the target; a first high voltage power supply that supplies a first high voltage between the cathode and the first intermediate electrode; a second intermediate electrode disposed between the first intermediate electrode and the target; a second high voltage power supply that supplies a second high voltage between the first intermediate electrode and the second intermediate electrode; a third high voltage power supply that supplies a third high voltage between the second intermediate electrode and the target; and a phase setting unit that controls at least two of the first high voltage power supply, the second high voltage power supply, and the third high voltage power supply, so that a phase of a ripple component of the first high voltage output from the first high voltage power supply, a phase of a ripple component of the second high voltage output from the second high voltage power supply, and a phase of a ripple component of the third high voltage output from the third high voltage power supply have a predetermined relationship.

According to the 12th aspect of the present invention, it is preferred that in the X-ray generation device according to the 11th aspect, a period of the ripple component of the first high voltage, a period of the ripple component of the second high voltage, and a period of the ripple component of the third high voltage are almost the same; and the phase setting unit controls at least two of the first high voltage power supply, the second high voltage power supply, and the third high voltage power supply, so that the phase of the ripple component of the first high voltage and the phase of the ripple component of the second high voltage are substantially 120° apart, and the phase of the ripple component of the second high voltage and the phase of the ripple component of the third high voltage are substantially 120° apart.

According to the 13th aspect of the present invention, it is preferred that in the X-ray generation device according to the 11th or 12th aspect, each of the first high voltage power supply, the second high voltage power supply, and the third high voltage power supply comprises an AC voltage generation unit and a voltage multiplying rectifier circuit that generates the first high voltage, the second high voltage, or the third high voltage respectively as a predetermined multiple of the voltage output by the respective AC voltage generation unit; and the AC voltage generation units generate AC voltages of predetermined periods based upon control signals output from the phase setting unit.

According to the 14th aspect of the present invention, it is preferred that in the X-ray generation device according to the 13th aspect, each of the voltage multiplying rectifier circuits comprises a plurality of electrostatic capacitor elements.

According to the 15th aspect of the present invention, it is preferred that in the X-ray generation device according to any one of the 11th through 14th aspect further comprises an X-ray detection unit that detects X-rays emitted from the target; and wherein the phase setting unit controls at least two of the first high voltage power supply, the second high voltage power supply, and the third high voltage power supply, based upon the detection output of the X-ray detection unit.

According to the 16th aspect of the present invention, a X-ray device comprises: the X-ray generation device according to any one of the 1st through 15th aspects; a detection unit that detects X-rays that are emitted from the X-ray generation device and that pass through an object; and a shifting unit that shifts the X-ray generation device and the detection unit relatively with respect to the object.

According to the 17th aspect of the present invention, the X-ray device according to the 16th aspect may further comprise a reconstruction unit that, in a state in which positions of the X-ray generation device and the detection unit with respect to the object are different, generates internal structure information for the object based upon a plurality of items of projection data detected by the detection unit.

According to the 18th aspect of the present invention, a method for manufacturing structure comprises: creating design information relating to the shape of a structure; manufacturing the structure based upon the design information; acquiring shape information by investigating, in use of the X-ray device according to the 17th aspect, a shape of the structure that has been manufactured; and comparing the shape information that has been acquired and the design information.

According to the 19th aspect of the present invention, it is preferred that in the method for manufacturing structure according to the 18th aspect, reprocessing of the structure is performed and executed based upon results of comparison of the shape information and the design information.

According to the 20th aspect of the present invention, it is preferred that in the method for manufacturing structure according to the 19th aspect, the reprocessing of the structure includes manufacturing the structure again based upon the design information.

Advantageous Effects of Invention

According to the present invention it is possible to reduce the influence of any ripple component generated in the acceleration voltage for accelerating the electron beam.

BRIEF DESCRIPTION OF DRAWINGS

FIG. 4 is a figure relating to the first through the third embodiments of the present invention, for explanation of ripple components in voltages generated by first and second voltage multiplying rectifier circuits, and for explanation of a fluctuation component in an acceleration voltage;

DESCRIPTION OF EMBODIMENTS

The First Embodiment

A first embodiment of the present invention will now be explained with reference to the drawings. An X-ray device radiates X-rays against an object to be investigated, and acquires internal information related to the object to be investigated (for example, its internal structure) and so on in a non-destructive manner by detecting the transmitted X-rays that have passed through the object to be investigated. If the object to be investigated, i.e. the object that is to be the subject of investigation, is an industrial component such as, for example, a mechanical component or an electronic component or the like, then the X-ray device may be a so-called X-ray CT test device for industrial use in testing components for industry.

Furthermore, this embodiment is provided for explanation of the present invention in concrete terms in order for its gist to be understood, and is not to be considered to be limitative of the present invention in any way, unless particularly so specified.

Figure 1:
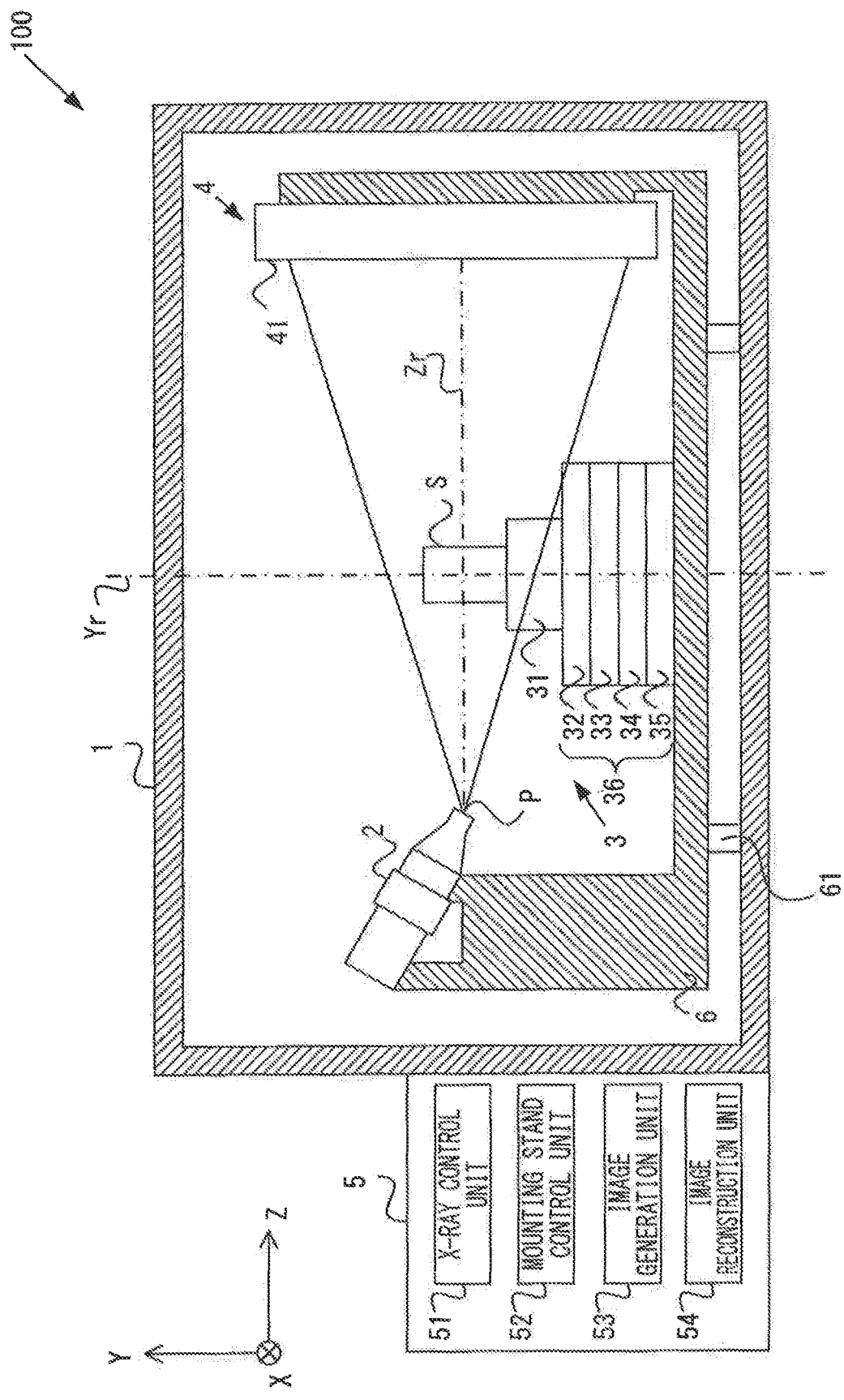
FIG. 1 is a figure showing the structure of an X-ray device according to an embodiment of the present invention.

FIG. 1 is a figure showing an example of the structure of an X-ray device 100 according to this first embodiment. It should be understood that, for convenience of explanation, a coordinate system having an X axis, a Y axis, and a Z axis is established as shown in the figure.

This X-ray device 100 comprises a housing 1, an X-ray generation unit 2, a mounting unit 3, a detector 4, a control device 5, and a frame 6. The housing 1 is disposed upon the floor surface of a workplace or the like so as to be substantially parallel to the X-Z plane, and the X-ray generation unit 2, the mounting unit 3, the detector 4, and the frame 6 are contained within its interior. The housing 1 includes lead as a material, in order for X-rays not to leak out to the exterior of the housing 1.

Under control by the control device 5, the X-ray generation unit 2 emits X-rays that spread out in a cone (i.e. a so-called conical beam) toward the +Z axis direction along an optical axis Zr that is parallel to the Z axis and that have an emission point P as vertex, as shown in FIG. 1. This emission point P coincides with a focal point of an electron beam propagating within this X-ray generation unit 2, as will be described hereinafter. In other words, the optical axis Zr is an axis that connects the emission point P, which is a focal point of the electron beam of the X-ray generation unit 2, to the center of an image capture region of the detector 4 that will be described hereinafter. It should be understood that a construction in which, instead of emitting X-rays in a cone shape, the X-ray generation unit 2 emits X-rays in a fan shape (a so-called fan beam) or emits X-rays in a linear shape (a so-called pencil beam) is also to be considered as being included in the scope of the present invention. The X-ray generation unit 2, for example, may emit X-rays of at least one of these types: ultra soft X-rays of around 50 eV, soft X-rays of around 0.1 to 2 keV, X-rays of around 2 to 20 keV, and hard X-rays of around 20 to 100 keV. It should be understood that the details of the X-ray generation unit will be described and explained hereinafter.

The mounting unit 3 comprises a manipulator unit 36 that includes a stage 31 upon which the object S to be investigated is mounted, a rotational drive unit 32, an X axis shifting unit 33, a Y axis shifting unit 34, and a Z axis shifting unit 35, and is provided more toward the +Z axis side than the X-ray generation unit 2. The stage 31 is provided so as to be driven to rotate by the rotational drive unit 32, and, when the axis Yr of this rotation by the rotational drive unit 32 shifts in the X axis direction, the Y axis direction, or the Z axis direction as will be described hereinafter, the stage 31 is shifted along therewith. The rotational drive unit 32 may, for example, be built based upon an electrically driven motor or the like, and rotates the stage 31 around the rotational axis Yr, which is parallel to the Y axis and moreover passes through the center of the stage 31, due to rotational power generated by an electrically operated motor that is driven under control by the control device 5 that will be described hereinafter. The X axis shifting unit 33, the Y axis shifting unit 34, and the Z axis shifting unit 35 are controlled by the control device 5 to shift the stage 31 along the X axis direction, the Y axis direction, and the Z axis direction respectively, so as to position the object S to be investigated within the range of radiation of the X-rays emitted from the X-ray generation unit 2. Furthermore, the Z axis drive unit 35 is controlled by the control device 5 to shift the stage 31 in the Z axis direction, so that the distance from the X-ray generation unit 2 to the object S to be investigated becomes equal to a distance that corresponds to the magnification ratio of the object S to be investigated in the image that is photographed.

The detector 4 shown in FIG. 1 is provided more to the +Z axis side than the X-ray generation unit 2 and the stage 31. In other words, along the Z axis direction, the stage 31 is provided between the X-ray generation unit 2 and the detector 4. The detector 4 has a plane of incidence 41 that is parallel to the X-Y plane, and X-rays included in the transmitted X-rays that have been emitted from the X-ray generation unit 2 and that have passed through the object S under investigation, which is mounted upon the stage 31, are incident upon this plane of incidence 41. The detector 4 is built to include a scintillator unit that includes a per se known scintillation substance, a light reception unit that receives light emitted by that scintillation unit, and so on, and converts the X-rays incident upon the plane of incidence 41 of the scintillator unit into optical energy, then converts this optical energy into electrical energy with the light reception unit described above, and then outputs this electrical energy to the control device 5 as an electrical signal. It should be understood that it would also be acceptable to arrange for the detector 4 to convert the incident X-rays into an electrical signal that is then outputted, without converting them into optical energy. Moreover, the detector 4 has a construction in which each of the scintillator unit and the light reception unit is divided into a plurality of pixels, and those pixels are arranged in a two dimensional array. Due to this, it is possible to acquire the intensity distribution of the X-rays that are emitted from the X-ray generation unit 2 and that have passed through the object S under investigation all together at once. Accordingly, it is possible to acquire an entire projected image of the object S under investigation with a single episode of photography.

The frame 6 supports the X-ray generation unit 2, the manipulator unit 36 of the mounting unit 3, and the detector 4. This frame 6 is built to have adequate rigidity. Accordingly it becomes possible, during acquisition of the projected image of the object S under investigation, to support the X-ray generation unit 2, the manipulator unit 36, and the detector 4 without their relative positions changing. Moreover, the frame 6 is supported by an anti-vibration mechanism 61, so that vibrations generated from the exterior are prevented from being transmitted to the frame 6.

The control device 5 comprises a microprocessor and peripheral circuitry thereof, and controls the various sections of this X-ray device 100 by reading in and executing a control program that is stored in advance in a storage medium (for example a flash memory or the like) not shown in the figures. The control unit 5 includes, as functions, a manipulator control unit 52 that controls the drive operation of the manipulator unit 36, an image generation unit 53 that generates projected X-ray image data for the object S to be investigated on the basis of the electrical signal outputted from the detector 4, and an image reconstruction unit 54 that performs per se known image reconstruction processing on the basis of the projected image data for the object S to be investigated for various different projection directions while controlling the manipulator unit 36, and thereby generates a reconstructed image of the object S to be investigated. Three dimensional data giving the internal structure of the object S to be investigated (i.e. specifying its cross sectional structure) is generated by this image reconstruction processing. In this case, this image reconstruction processing may be a back projection method, a filtered back projection method, an iterative reconstruction method, or the like.

Figure 2:
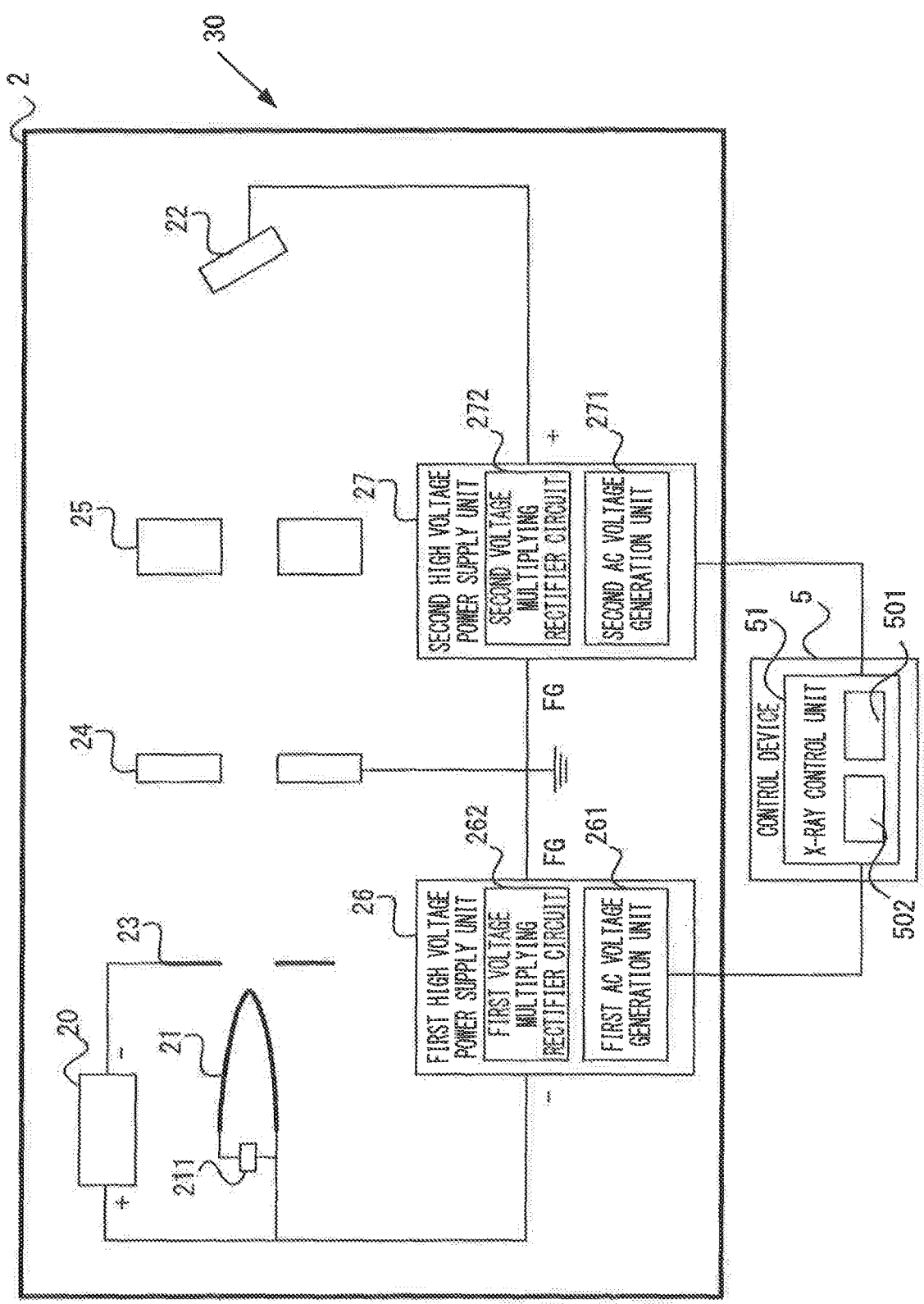
FIG. 2 is a figure showing the structure of an X-ray generation unit according to the first embodiment.

The details of the X-ray generation device 30 according to this first embodiment comprising the X-ray generation unit 2 and the X-ray control unit 51 of the control device 5 will now be explained with reference to FIG. 2. FIG. 2 is a figure schematically showing the structure of this X-ray generation device 30. The X-ray generation unit 2 comprises a Wehnelt power supply 20, a filament 21, a target 22, a Wehnelt electrode 23, an intermediate electrode 24, an electron optics member 25, a first high voltage power supply unit 26, and a second high voltage power supply unit 27. In the X-ray generation unit 2, the filament 21, the intermediate electrode 24, the electron optics member 25, and the target 22 are arranged in sequence in that order. In other words, the intermediate electrode 24 is provided between the filament 21 and the target 22.

The Wehnelt power supply 20 supplies a negative bias voltage to the Wehnelt electrode 23 with respect to the filament 21. The filament 21 may, for example, include tungsten, and has a sharpened conical shape that points toward the target 22. A power supply circuit 211 is provided between the ends of the filament 21 for heating it. This filament heating power supply circuit 211 heats the filament 21 by flowing electric current through the filament 21. When the filament 21 is heated by current being passed through it by the filament heating power supply circuit 211 in the state in which negative charge is being supplied to the Wehnelt electrode 23, an electron beam (i.e. thermo electron) is emitted toward the target 22 from the sharpened end of the filament. Due to the electric field generated by the negative bias voltage supplied to the Wehnelt electrode 23, this electron beam emitted from the filament 21 converges, and divergence of the emitted electron beam is suppressed. The target 22, for example, may include tungsten, and emits X-rays due to collision or change of progression of the electron beam that has been emitted from the filament 21. While here a case is shown by way of example in which the X-ray generation unit 2 according to this embodiment is built as a reflective type X-ray generation unit as shown in FIG. 2, a case in which the X-ray generation unit is built as a transmission type X-ray generation unit is also to be considered as being included as an aspect of the present invention.

The intermediate electrode 24 is grounded. Accordingly, with respect to the intermediate electrode 24, a negative voltage is supplied to the filament 21. The electron optics member 25 is disposed between the intermediate electrode 24 and the target 22. This electron optics member 25 is built around an electromagnetic lens that focuses the electron beam, a deflector that deflects the electron beam, or the like.

The electron optics member 25 focuses the electron beam from the filament 21 by employing the action of a magnetic field, and causes the electron beam to collide with a partial region of the target 22 (the X-ray focal point).

The first high voltage power supply unit 26 is electrically connected to the filament 21 and to the intermediate electrode 24, and supplies a negative voltage to the filament 21 with respect to the intermediate electrode 24. This first high voltage power supply 26 is controlled by the X-ray control unit 51 of the control device 5, and supplies a first high voltage V1 between the filament 21 and the intermediate electrode 24. And the second high voltage power supply unit 27 is electrically connected to the intermediate electrode 24 and to the target 22, and supplies a positive voltage to the target 22 with respect to the intermediate electrode 24. This second high voltage power supply 27 is controlled by the X-ray control unit 51 of the control device 5, and supplies a second high voltage V2 between the intermediate electrode 24 and the target 22. The first high voltage power supply unit 26 and the second high voltage power supply unit 27 are arranged in series between the filament 21 and the target 22. Due to this, the filament 21 has a negative electrical potential with respect to the target 22.

When the first high voltage V1 is supplied by the first high voltage power supply unit 26, as described above, the filament 21 functions as a cathode that emits an electron beam. In this embodiment, as one example, the filament 21 acts as a cathode while heat is being directly supplied thereto. However, the present invention is not to be considered as being limited to this example; it would also be possible for heat to be supplied from a separate heater to a cathode. Furthermore, it would also be possible to arrange for heat not to be supplied to the cathode, but to cause an electron beam to be emitted by creating a strong electric field in the neighborhood of the cathode. The electron beam that has been emitted from the filament 21 toward the target 22 is squeezed by the Wehnelt electrode 23, and is accelerated toward the target 22 by a high acceleration voltage V3, which corresponds to the sum of the first high voltage V1 supplied by the first high voltage power supply unit 26 and the second high voltage V2 supplied by the second high voltage power supply unit 27. And the electron beam is focused by the electron optics member 25, and this focused electron beam then collides with the target 22 which is disposed at the position of convergence of the electron beam (i.e. at its focal spot), so that X-rays are emitted from the target 22.

Figure 3:
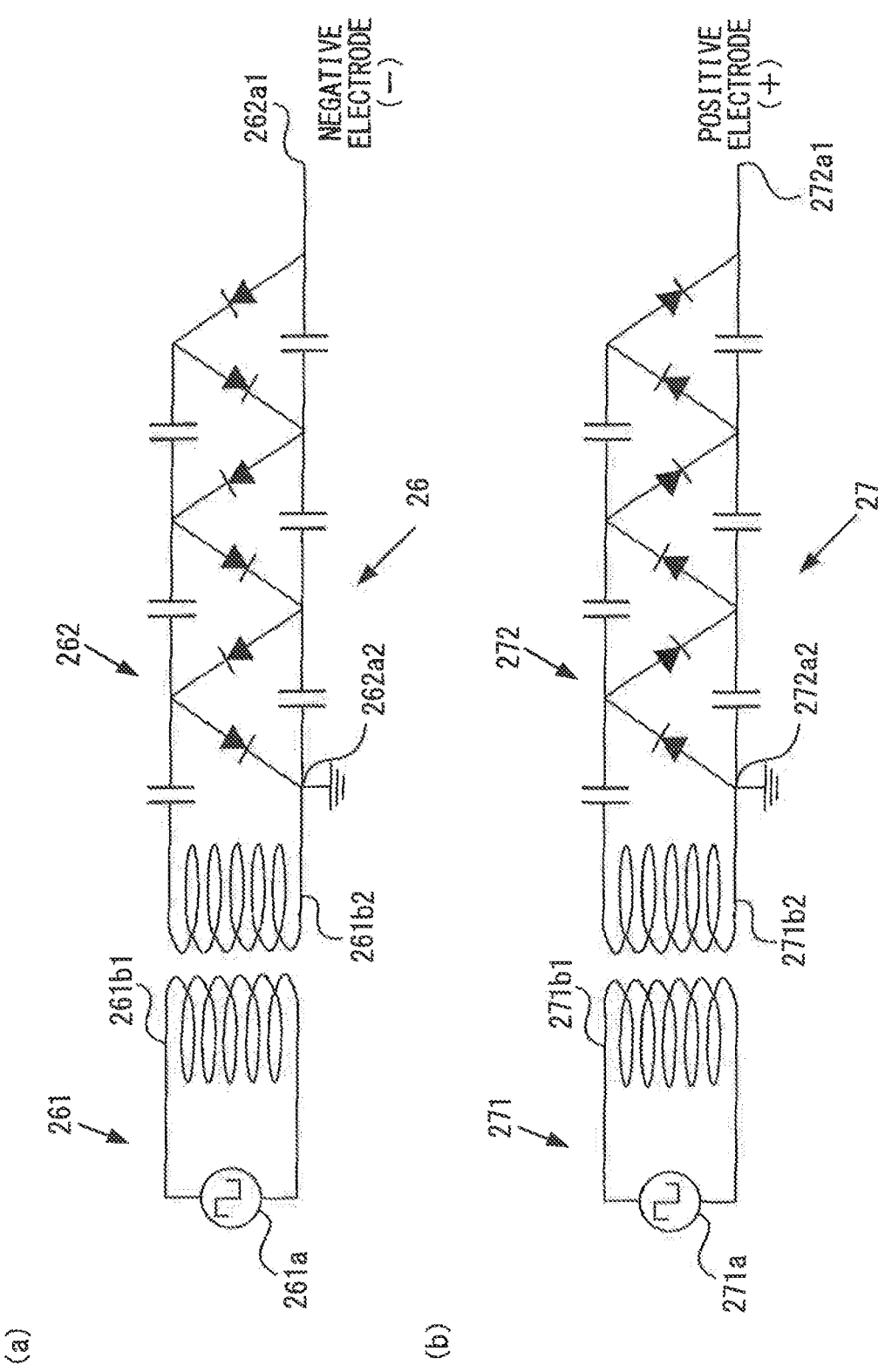
FIG. 3 consists of circuit diagrams for explanation of high voltage power supplies in the first embodiment and in a third embodiment.

The structures of the first high voltage power supply unit 26 and second high voltage power supply unit 27 will now be explained using the circuit diagrams shown in FIG. 3. FIG. 3(a) is a structural circuit diagram for the first high voltage power supply unit 26, and FIG. 3(b) is a structural circuit diagram for the second high voltage power supply unit 27. The first high voltage power supply unit 26 comprises a first AC voltage generation unit 261 and a first voltage multiplying rectifier circuit 262, while the second high voltage power supply unit 27 comprises a second AC voltage generation unit 271 and a second voltage multiplying rectifier circuit 272. It should be understood that, since the first high voltage power supply unit 26 and the second high voltage power supply unit 27 have the same structure, in the following explanation attention will be concentrated upon the structure of the first high voltage power supply unit 26, and, in relation to the second high voltage power supply unit 27, only structural portions that are different from those of the first high voltage power supply unit 26 will be explained.

As shown in FIG. 3(a), the first AC voltage generation unit 261 is controlled by the X-ray control unit 51 of the control device 5 that will be described hereinafter, and outputs a square wave AC voltage (i.e. a pulse wave) having a predetermined period. When the voltage of the AC power supply 261a of the first AC voltage generation unit 261 is supplied to a primary winding 261b1 of a transformer, a voltage is generated between the two ends of its secondary winding 261b2.

The first voltage multiplying rectifier circuit 262 is built as a per se known Cockcroft-Walton circuit that incorporates a plurality of capacitors and a plurality of diodes. While rectifying the AC voltage output from the first AC voltage generation unit 261, this first voltage multiplying rectifier circuit 262 boosts the voltage thereof by a predetermined magnification. In this first voltage multiplying rectifier circuit 262, a ground electrode 262a2 is connected to the secondary winding 261b2 of the first voltage multiplying rectifier circuit 262, so that an output terminal 262a1 is able to acquire a high negative voltage with respect to the ground electrode 262a2. The output terminal 262a1 is connected to the cathode, in other words to the filament 21, and the ground electrode 262a2 is connected to the intermediate electrode 24. With this first voltage multiplying rectifier circuit 261, charging up of the plurality of capacitors of the first voltage multiplying rectifier circuit 262 is performed by changing over the positive and negative of the voltage generated between the two ends of the secondary winding 261b2 described above, so that an output voltage that is many times the voltage across the secondary winding 261b2 is generated. The more capacitor-diode combinations the first voltage multiplying rectified circuit 262 includes, the higher is the output voltage.

In the second high voltage power supply unit 27 shown in FIG. 3(b), the structure of the second voltage multiplying rectifier circuit 272 is different from the structure of the first voltage multiplying rectifier circuit 262 of the first high voltage power supply unit 26. In this second voltage multiplying rectifier circuit 272, the polarities of the pluralities of diodes are reversed with respect to the first voltage multiplying rectifier circuit 262. Accordingly, it is possible for the output terminal 272a1 to acquire a high positive voltage with respect to the ground electrode 272a2. The output terminal 272a1 is connected to the target 22, and the ground electrode 272a2 is connected to the intermediate electrode 24.

The X-ray control unit 51 shown in FIG. 2 may, for example, be built as an FPGA circuit. Internally, the X-ray control unit 51 comprises a reference clock signal generation unit 501 and a phase difference adjustment unit 502. The X-ray control unit 51 outputs control signals to the first AC voltage generation unit 261 and to the second AC voltage generation unit 271 whose phases are adjusted to a predetermined cycle. In other words, the first AC voltage generation unit 261 and the second AC voltage generation unit 271 generate pulse form AC voltages of the same period corresponding to the period of the reference clock signal from the reference clock signal generation unit 501. Upon, for example, actuation of an actuation member (not shown in the figures) by the user, by controlling the phase difference adjustment unit 502, the X-ray control unit 51 is able to adjust the phase difference of the AC voltages generated respectively by the first AC voltage generation unit 261 and by the second AC voltage generation unit 271. In other words, the X-ray control unit 51 performs control so that the phases of the two pulse waves have a predetermined mutual relationship. The phase difference adjustment unit 502 also could be built upon a delay circuit consisting of a variable resistor and/or a variable capacitor. Moreover, it would also be possible to provide a structure incorporating several stages of capacitors and switching elements, and in which the phase difference is adjusted by controlling the opening and closing operation of these switching elements. It is arranged to delay the phase of at least one or the other of the first AC power supply generation unit 261 and the second AC power supply generation unit 271. In the following, a system will be explained in which, in this embodiment, the phase of the pulse wave produced by the second AC voltage generation unit 271 is delayed.

As shown in the schematic figure of FIG. 4, triangular wave-like ripple components (i.e. ripples) are generated in both the two DC voltages that are respectively rectified by the first voltage multiplying rectifier circuit 262 and the second voltage multiplying rectifier circuit 272 described above. These ripples are created due to the charge and discharge time periods of the capacitors that are employed in the first voltage multiplying rectifier circuit 262 and in the second voltage multiplying rectifier circuit 272. It should be understood that, in FIG. 4, time t is shown along the horizontal axis, and the ripple component in the first high voltage V1 generated by the first voltage multiplying rectifier circuit 262 is denoted by L1, the ripple component in the second high voltage V2 generated by the second voltage multiplying rectifier circuit 272 is denoted by L2, and the ripple component in the acceleration voltage V3 for accelerating the electron beam emitted from the filament 21 is denoted by L3.

As described above, according to the control signal from the X-ray control unit 51, the first AC voltage generation unit 261 and the second AC voltage generation unit 271 generate pulse signals of predetermined period. Accordingly, the ripple components L1, L2 in the DC voltages shown in FIG. 4 output respectively by the first voltage multiplying rectifier circuit 262 and by the second voltage multiplying rectifier circuit 272 have substantially the same periods as the pulse waves generated by the first AC voltage generation unit 261 and the second AC voltage generation unit 271. Moreover, each of the first voltage multiplying rectifier circuit 262 and the second voltage multiplying rectifier circuit 272 comprises a plurality of capacitors.

The ripple component L3 in the acceleration voltage V3 that results from addition together of the first high voltage V1 and the second high voltage V2 is the result of adding together the ripple component L1 and the ripple component L2.

An example is schematically shown in FIG. 4(a) for a case in which the phases are not controlled by the X-ray control unit 51 to have a predetermined mutual relationship. At the time point t1 in FIG. 4(a), when the position of the intermediate electrode 24 is grounded, the potential difference from ground of the ripple component L1 in the first high voltage V1 is V1_1a, while the potential difference from ground of the ripple component L2 in the second high voltage V2 is V2_1a. Due to this, the potential difference of the ripple component L3 in the acceleration voltage V3 at the time point t1 is (V1_1a+V2_1a). It should be understood that, in FIG. 4, with the objective of making the present invention easy to understand, the value of the potential difference from ground V1_1a and the value of the potential difference V2_1a are treated as being equal.

At the time point t2 that is half a period after the time point t1, the potential difference of the ripple component L1 in the first high voltage V1 is V1_2a (V1_1a>V1_2a), while the potential difference from ground of the ripple component L2 in the second high voltage V2 is V2_2a (V2_1a>V2_2a). Due to this, the potential difference of the ripple component L3 in the acceleration voltage V3 at the time point t2 becomes (V1_2a+V2_2a), which is a smaller potential difference than the potential difference at the time point t1. Accordingly, as shown in FIG. 4(a), the ripple component L3 in the acceleration voltage V3 is periodic, and increases and decreases repeatedly. It should be understood that, in FIG. 4, with the objective of making the present invention easy to understand, the value of the potential difference from ground V1_2a and the value of the potential difference V2_2a are treated as being equal.

The ripple component L3 generated in the acceleration voltage V3 between the filament 21 and the target 22 exerts an influence during the acceleration of the electron beam emitted from the filament 21, and accordingly the speed of the electron beam as it passes through the electron optics member 25 changes according to the amplitude of the ripple component L3 in its fluctuation cycle. Due to this, the amount of aberration of the electron optics member 25, and in particular the amount of chromatic aberration, fluctuates, so that the region within which the electron beam collides with the target 22, in other words the spot size of the emission point P, also fluctuates. Since fluctuation of the spot size causes fluctuation of the resolution of the projected image when X-rays emitted from the X-ray generation unit 2 are acquired by the detector 4, accordingly it becomes impossible to maintain the accuracy of investigation by the X-ray device 100.

In this embodiment, in order to suppress fluctuations of the spot size, the phase adjustment unit 502 of the X-ray control unit 51 outputs a control signal to the second AC voltage generation unit 217 so as to control the phase of the AC voltage generated by the second AC voltage generation unit 271, and thereby sets the phases of the ripple components L1 and L2 to a predetermined relationship. In this case, the phase adjustment unit 502 delays the phase of the AC voltage generated by the second AC voltage generation unit 271; for example, it may set the phase difference between the AC voltage generated by the first AC voltage generation unit 261 and the AC voltage generated by the second AC voltage generation unit 271 to be a half cycle (i.e. 180°). As a result, the phase of the ripple component L1 of the first voltage multiplying rectifier circuit 261 and the phase of the ripple component L2 of the second voltage multiplying rectifier circuit 272 are different by a half cycle (i.e. 180°). It should be understood that it would also be acceptable to delay the phase of the AC voltage from the first AC voltage generation unit 261.

An example is schematically shown in FIG. 4(b) for a case in which the phases are controlled by the X-ray control unit 51 to have a predetermined mutual relationship. At the time point t1 in FIG. 4(b), the potential difference from ground of the ripple component L1 is V1_1a, while the potential difference from ground of the ripple component L2 is V2_2a. Due to this, the potential difference of the fluctuation component L3 of the acceleration voltage V3 at the time point t1 is (V1_1a+V2_2a). At the time point t2 that is half a period after the time point t1, the potential difference of the fluctuation component L1 is V1_2a, while the potential difference from ground of the fluctuation component L2 is V2_1a. Due to this, the potential difference of the ripple component L3 in the acceleration voltage V3 at the time point t2 becomes (V1_2a+V2_1a). Since the values of the potential difference V1_1a and the value of the potential difference V2_1a are equal, and the values of the potential difference V1_2a and the potential difference V2_2a are equal, accordingly the potential differences of the ripple component L3 at the time point t1 and at the time point t2 become substantially the same, and thus the acceleration voltage V3 is smoothed. Since, as a result, the electron beam is accelerated without any fluctuations due to the acceleration voltage V3, accordingly fluctuation of the amount of aberration in the electron beam due to the electron optics member 25 is suppressed, and thereby X-rays are emitted from the X-ray generation unit 2 in a state in which fluctuation of the spot size is suppressed.

The X-rays emitted from the X-ray generation unit 2 pass through the object S under investigation and are incident upon the detector 4. For each of a plurality of predetermined rotational angles of the stage 31, the detector 4 detects the transmitted X-rays that have passed through the object S under investigation, and outputs the results to the control device 5 as an electrical signal. In other words, the image generation unit 53 generates image data for the object S under investigation projected from a plurality of different directions. And the image reconstruction unit 54 of the control device 5 performs per se known image reconstruction processing for the object S under investigation by using this plurality of projected image data, and generates three dimensional data specifying the internal structure of the object S under investigation (i.e. its cross sectional structure). In this case, this image reconstruction processing may be a back projection method, a filtered back projection method, an iterative reconstruction method, or the like. The three dimensional data that has thus been generated specifying the internal structure of the object S under investigation is displayed upon a display (not shown in the figures) or the like.

The X-ray generation device 30 according to the first embodiment described above provides the following beneficial operational effects.

It is arranged for the second high voltage power supply 27 to output a second high voltage V2, such that the phase of the ripple component L2 in this second high voltage V2 has a predetermined relationship with respect to the phase of the ripple component L1 in the first high voltage V1 generated by the first high voltage power supply 26. In concrete terms, it is arranged for the X-ray control unit 51 to control at least one of the first high voltage power supply 26 and the second high voltage power supply 27, so that the phase of the ripple component L1 in the first high voltage V1 output from the first high voltage power supply 26 and the phase of the ripple component L2 in the second high voltage V2 output from the second high voltage power supply 27 are substantially 180° apart. Thus, since the generation of a fluctuation component L3 in the acceleration voltage V3 which results from the addition together of the first high voltage V1 and the second high voltage V2 is suppressed, accordingly the electron beam is accelerated without any fluctuations due to the acceleration voltage V3. As a result, X-rays are emitted from the X-ray generation unit 2 in a state in which fluctuation of the amount of aberration of the electron beam due to the electron optics member 25 is suppressed, so that fluctuation of the spot size is suppressed. Accordingly, fluctuations of the resolution of the projected images during acquisition by the detector 4 of the X-rays emitted from the target are suppressed, so that it is possible to maintain the accuracy of investigation of the object under investigation.

Furthermore, since the electron beam is accelerated by the large acceleration voltage V3 that is obtained due to the first high voltage power supply 26 and the second high voltage power supply 27, accordingly it is possible to increase the intensity of the X-rays that are emitted from the target 22. As a result, it is possible to acquire investigation data related to the internal structure of the object S that is under investigation by this X-ray device 100, even if the object S under investigation is a large sized structure or the like.

The Second Embodiment

A second embodiment of the X-ray device according to the present invention will now be explained with reference to the drawings. In the following explanation, the same reference symbols will be appended to structural elements that are the same as ones in the first embodiment, and the explanation will concentrate upon differences. What are not particularly explained are the same as in the first embodiment. This second embodiment is different from the first embodiment in that the X-ray generation unit is provided with two intermediate electrodes.

Figure 5:
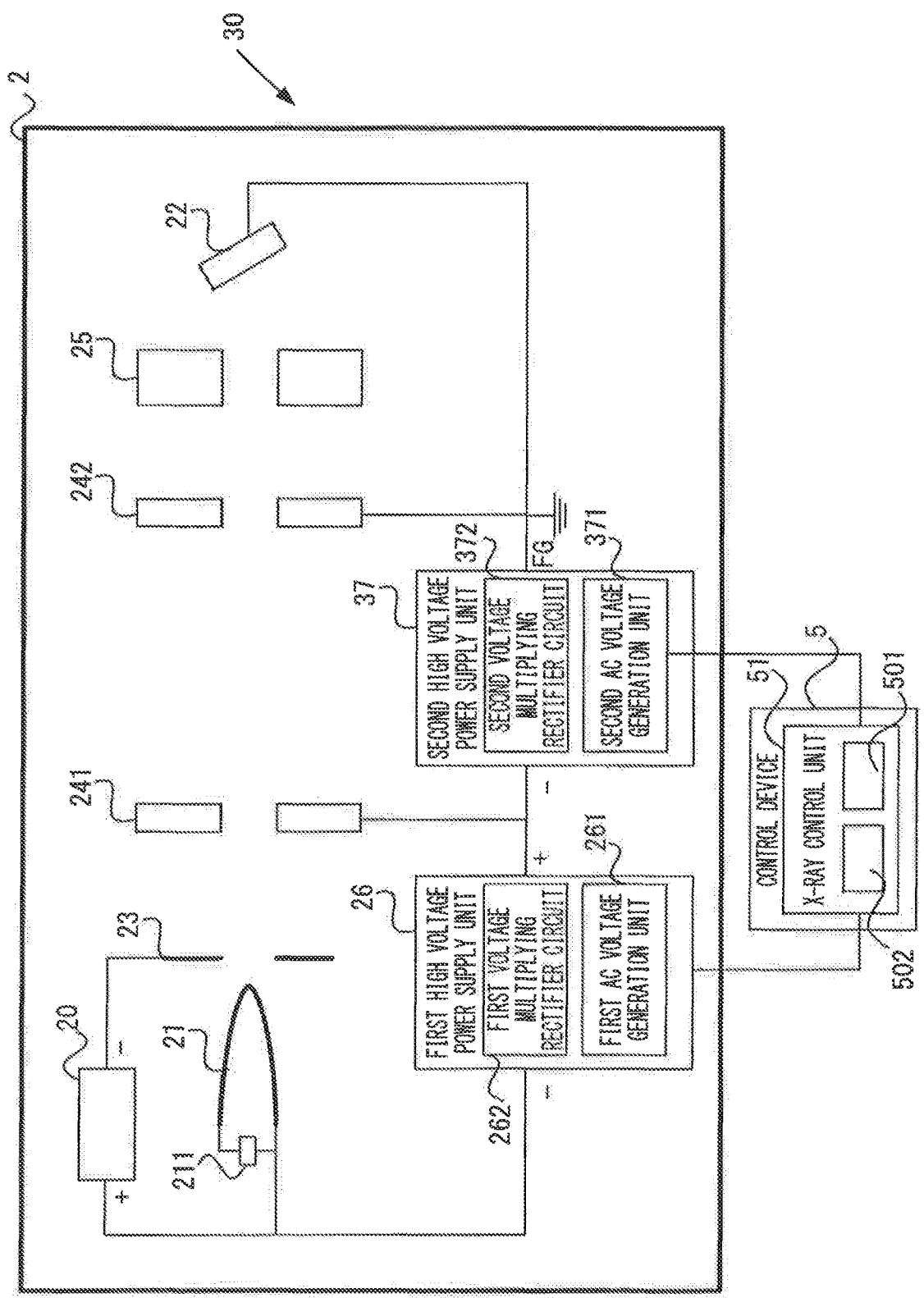
FIG. 5 is a figure showing the structure of an X-ray generation device according to a second embodiment.

FIG. 5 is a figure schematically showing the structure of an X-ray generation unit 2 according to this second embodiment. The X-ray generation unit 2 according to this embodiment comprises a first intermediate electrode 241 and a second intermediate electrode 242, instead of the intermediate electrode 24 of the first embodiment. The first intermediate electrode 241 and the second intermediate electrode 242 are provided between the filament 21 and the electron optics member 25. The first intermediate electrode 241 is provided more toward the side of the filament 21, while the second intermediate electrode 242 is provided more toward the electron optics member 25. It should be understood that, in this embodiment, the second intermediate electrode 242 is grounded.

A first high voltage power supply unit 26 is electrically connected to the filament 21 and to the first intermediate electrode 241, and supplies a negative voltage to the filament 21 with respect to the first intermediate electrode 241. This first high voltage power supply unit 26 is controlled by the X-ray control unit 51, and supplies a first high DC voltage V1 between the filament 21 and the first intermediate electrode 241. And a second high voltage power supply unit 37 is electrically connected to the first intermediate electrode 241 and to the second intermediate electrode 242, and supplies a positive voltage to the second intermediate electrode 242 with respect to the first intermediate electrode 241. This second high voltage power supply unit 37 is controlled by the X-ray control unit 51, and supplies a second high DC voltage V2 between the first intermediate electrode 241 and the second intermediate electrode 242. It should be understood that the second intermediate electrode 242 and the target 22 are at the same electrical potential.

Figure 6:
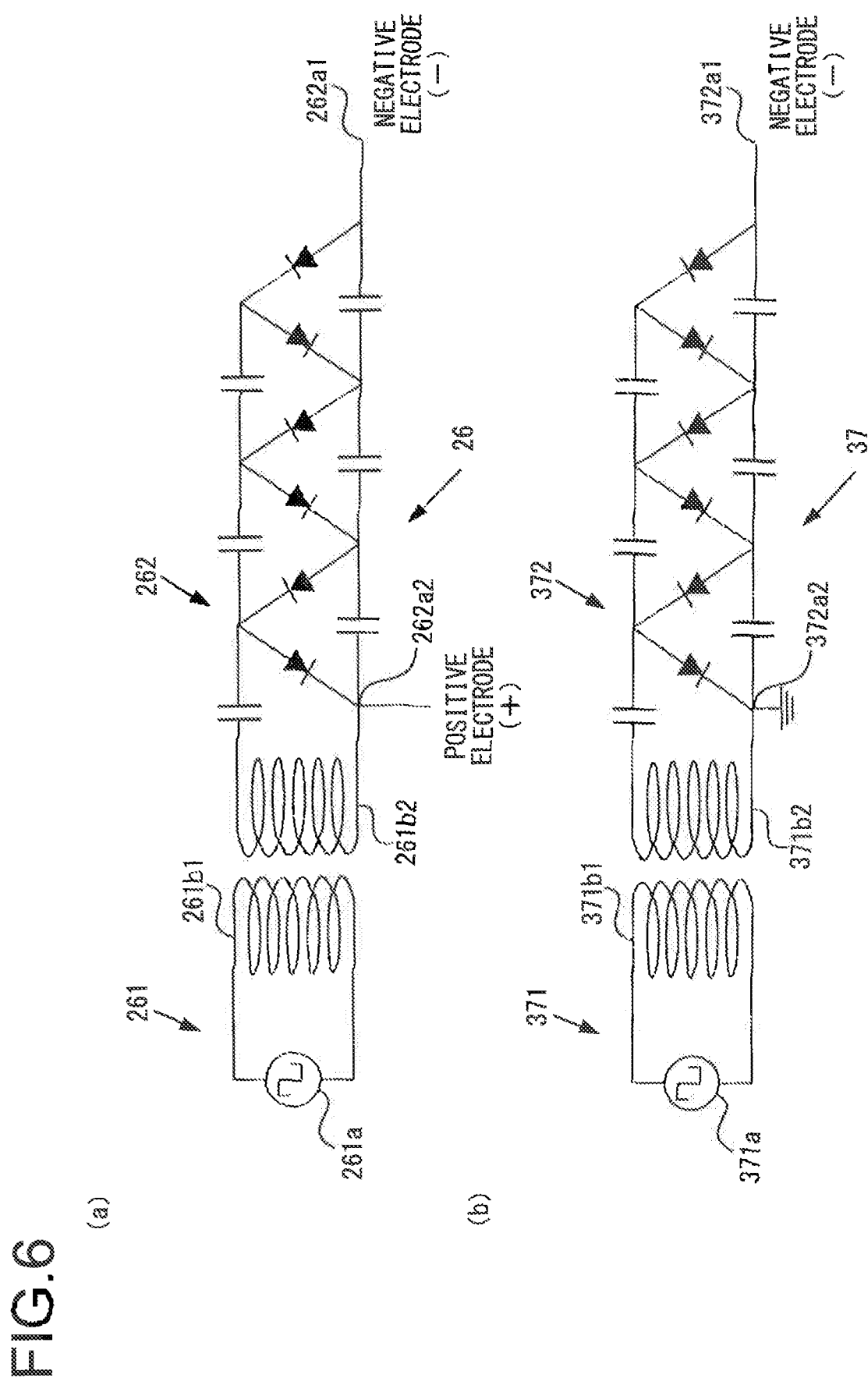
FIG. 6 consists of circuit diagrams for explanation of high voltage power supplies in the second embodiment.

The structures of the first high voltage power supply unit 26 and the second high voltage power supply unit 37 according to this second embodiment will now be explained using the circuit diagrams shown in FIG. 6. FIG. 6(*a*) is a structural circuit diagram for the first high voltage power supply unit 26, and FIG. 6(*b*) is a structural circuit diagram for the second high voltage power supply unit 37. In a similar manner to the case in the first embodiment, the first high voltage power supply unit 26 comprises a first AC voltage generation unit 261 and a first voltage multiplying rectifier circuit 262. However, an output terminal 262*a*2 on the side of a secondary winding 261*b*2 of the first voltage multiplying rectifier circuit 262 is connected to the first intermediate electrode 241, while an output terminal 262*a*1 is connected to the filament 21. Accordingly, by the first voltage multiplying rectifier circuit 262 rectifying the AC voltage output from the first AC voltage generation unit 261 and boosting it by a predetermined magnification, it is possible for the output terminal 262*a*1 to acquire a high negative voltage V1 with respect to the first intermediate electrode 241.

And, as shown in FIG. 6(*b*), the second high voltage power supply unit 37 comprises a second AC voltage generation unit 371 and a first voltage multiplying rectifier circuit 372. The second AC voltage generation unit 371 has the same circuit structure as the first AC voltage generation unit 261. In other words, when the voltage of an AC power supply 371*a* of the second AC voltage generation unit 371 is supplied to a primary winding 371*b*1 of a transformer, voltage is generated between the two ends of a secondary winding 371*b*2 thereof. And the second voltage multiplying rectifier circuit 372 has the same structure as the first voltage multiplying rectifier circuit 262. In other words, in the second voltage multiplying rectifier circuit 372, the polarities of the plurality of diodes are provided as not being inverted with respect to the polarities of the plurality of diodes that are provided to the first voltage multiplying rectifier circuit 262. However, the ground electrode 372*a*2 of the second voltage multiplying rectifier circuit 372 is connected to the second intermediate electrode 242, while its output terminal 372*a*1 is connected to the first intermediate electrode 241. Accordingly, by the second voltage multiplying rectifier circuit 372 rectifying the AC voltage output from the second AC voltage generation unit 371 and boosting it by a predetermined magnification, it is possible for the second intermediate electrode 242 to acquire a high positive voltage V2 with respect to the first intermediate electrode 241.

With this embodiment as well, in order to suppress fluctuation in the spot size, in a similar manner to the case with the first embodiment, the X-ray control unit 51 outputs a control signal to the second AC voltage generation unit 371 so as to control the phase of its AC voltage, and thereby performs control so that the phases of the ripple components L1 and L2 mutually differ by a half period (i.e. 180°). In other words, in a similar manner to the case shown in FIG. 4(*b*), the X-ray control unit 51 delays the phase of the AC voltage produced by the second AC voltage generation unit 371, so as to make the phase difference between the AC voltage of the first AC voltage generation unit 261 and the AC voltage of the second AC voltage generation unit 371 be equal to a half period (i.e. 180°). It should be understood that a system in which the phase of the AC voltage of the first AC voltage generation unit 261 is delayed is also to be considered as being included as an embodiment of the present invention. As a result, the electrons emitted from the filament 21 are accelerated in a state in which the ripple component L3 of the acceleration voltage V3 is smoother out so as to become substantially constant.

As described above, a predetermined acceleration voltage is supplied to the electron beam between the filament 21 and the second intermediate electrode 24.

Moreover, since the second intermediate electrode 242 and the target 22 are at the same electrical potential, accordingly the electron beam that has passed the second intermediate electrode 242 is not accelerated during the interval until it collides with the target 22. In other words, the electron optics member 25 makes the electron beam converge as it proceeds at a constant speed. Accordingly, as compared with a system like that of the first embodiment in which the electron optics member 25 makes the electron beam converge while it is being accelerated between the intermediate electrode 24 and the target 22, it is possible to make it difficult for any influence to be experienced due to ripples generated by the second high voltage power supply 27, so that it is possible to reduce the spot size when the electron beam collides with the target 22.

With the X-ray generation device 30 according to the second embodiment described above, in addition to the beneficial operational effects obtained with the first embodiment, the following further beneficial operational effects are obtained.

The first intermediate electrode 241 is disposed between the filament 21 and the target 22, and the second intermediate electrode 242 is disposed between the first intermediate electrode 241 and the target 22. The first high voltage power supply 26 supplies the first high voltage V1 between the filament 21 and the first intermediate electrode 241, and the second high voltage power supply 37 supplies the second high voltage V2 between the first intermediate electrode 241 and the second intermediate electrode 242. And the electron optics member 25 is disposed between the second intermediate electrode 242 and the target 22. Thus, since the acceleration by the first high voltage power supply 26 and the second high voltage power supply 37 ends, and since it is possible for the electron beam to be converged by the electron optics member 25 while proceeding at a constant speed, accordingly it is possible to reduce the spot size when the electron beam collides against the target 22. As a result, it is possible to enhance the resolution during investigation of the object S under investigation by the X-ray device 100.

Furthermore, with this X-ray generation device 30 according to the second embodiment, since the second intermediate electrode 242 is grounded, accordingly the target 22 that is at the same electrical potential as the second intermediate electrode 242 is kept at ground electrical potential. Since generally the stage 31 is grounded via the frame 6 or the like, accordingly the object S under investigation which is mounted upon the stage 31 and the target 22 that is at ground electrical potential have the same electrical potential. Due to this, it is possible to prevent a large potential difference arising between the target 22 and the object S under investigation, as compared with the case in which a high positive electrical potential is supplied to the target 22 as in the first embodiment. In other words, since it is still possible to suppress the occurrence of anomalous electrical discharge from the target 22 even if the gap between the target 22 and the object S under investigation is extremely narrow, accordingly it becomes possible to acquire projected images of the object S under investigation at high magnification.

The Third Embodiment

A third embodiment of the X-ray device according to the present invention will now be explained with reference to the drawings. In the following explanation, to structural elements that are the same as ones in the first embodiment, the same reference symbols will be appended, and the explanation will concentrate upon differences. What are not particularly explained are the same as in the first embodiment. This third embodiment is different from the first embodiment in that the X-rays emitted from the target are investigated by using a test chart or the like, and the phases of the first and second high voltage power supply units are controlled on the basis of the results of this investigation.

Figure 7:
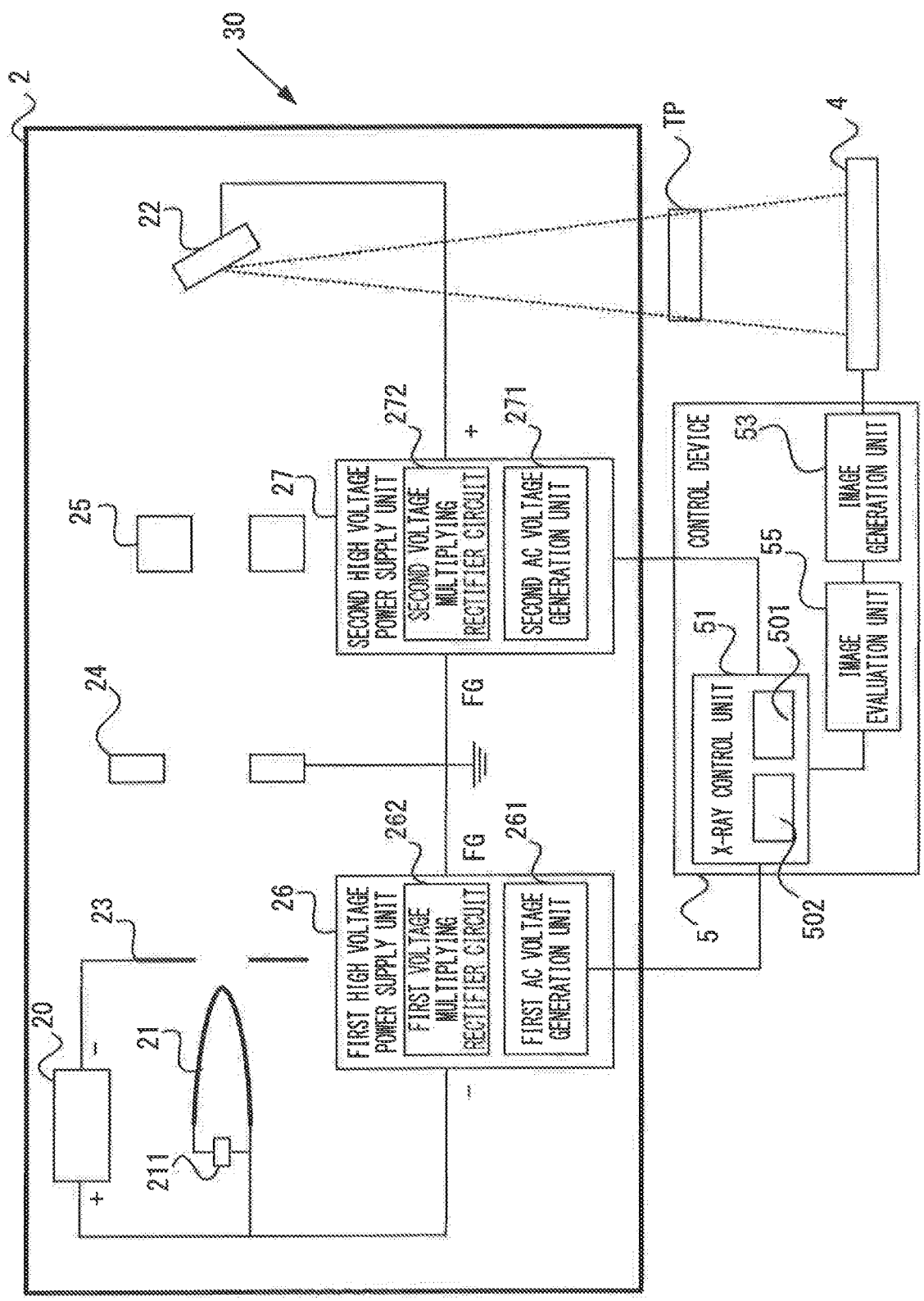
FIG. 7 is a figure showing the structure of an X-ray generation device according to the third embodiment.

FIG. 7 is a figure schematically showing the structure of an X-ray generation device 30 according to this third embodiment. In this embodiment, the control device 5 of the X-ray device 100 is also endowed with a function of acting as an image evaluation unit 55, so that the X-ray generation device 30 comprises an X-ray generation unit 2 having a structure similar to that of the first embodiment, a detector 4, an X-ray control unit 51 of the control device 5, an image generation unit 53, and the abovementioned image evaluation unit 55. The X-rays from the X-ray generation unit 2 are radiated upon a test piece TP (for example a JIMA chart) in which a minute slit or the like is formed, and then are incident upon the detector 4. The detector 4 converts the intensity distribution of the transmitted X-rays that have passed through the test piece TP into an electrical signal, which is then output to the image generation unit 53 of the control device 5. And the image generation unit 53 creates projected image data for the test piece TP on the basis of this electrical signal that is input.

Using this projected image data that has been created, and on the basis of the contrast of the slit or the like that is formed in the test piece TP, the image evaluation unit 55 determines upon the level of sharpness of the projected image. In this case, if the contrast is low, then the image evaluation unit 55 determines that the sharpness is also low. If the sharpness is lower than a predetermined threshold value, then the image evaluation unit 55 decides that fluctuations in the spot size of the electron beam are being generated due to the influence of the ripple component L3 in the acceleration voltage V3. It should be understood that the predetermined value described above is a value that is calculated on the basis of experimentation or the like, and it is supposed that it is stored in advance in a predetermined storage region (not shown in the figures).

If it has been determined by the image evaluation unit 55 that the sharpness is lower than the predetermined threshold value, then, in order to suppress fluctuations of the spot size, the X-ray control unit 51 outputs a control signal to the second AC voltage generation unit 271 so as to control the phases of the ripple components L1 and L2 to be half a period (i.e. 180°) apart, in a similar manner to the case in the first embodiment, as has been explained with reference to FIG. 4(b). It should be understood that it is desirable for the amount of deviation of the phases from the state during investigation to be set in advance, on the basis of the difference between the sharpness that has been detected and a threshold value. In this case, it is desirable for a table or the like in which differences between the detected sharpness and the threshold value are held in correspondence with amounts of phase deviation to be stored in advance in a predetermined storage region. Moreover, a system in which the phase of the pulse wave from the first AC voltage generation unit 261 is delayed is also to be considered as being one aspect of the present invention.

A system is also to be considered as being included within the scope of the present invention in which, if the sharpness is lower than the threshold value, then a message to the effect that there is a possibility that the resolution will decrease due to fluctuations occurring in the spot size is displayed upon a monitor (not shown in the figures); and a system in which audio data is output from a speaker (not shown in the figures) to notify the user is also included in the scope of the present invention. In this case, it will be acceptable for the X-ray control unit 51 to adjust the phase of the AC voltage with the second AC voltage generation unit 271, according to operation of an operation member (not shown in the figures) performed by the user upon receipt of the above notification.

With the X-ray generation device 30 according to the third embodiment described above, in addition to the beneficial operational effects obtained with the first embodiment, the following further beneficial operational effects are obtained.

The detector 4 detects the projected image of the test piece TP using X-rays generated from the target 22, the image generation unit 53 of the control device 5 acquires the projected image data for the test piece TP detected by the detector 4, and the image evaluation unit 55 determines upon the sharpness by using this projected image data. And it is arranged for the X-ray control unit 51 to control at least one of the first high voltage power supply 26 and the second high voltage power supply 27 on the basis of the sharpness that has thus been determined. Accordingly, by feeding back by using the sharpness of the projected image that is based upon the electrical signal output from the detector 4, it is possible to adjust at least one of the first high voltage power supply 26 and the second high voltage power supply 27 while checking upon the fluctuation component L3 created due to the acceleration voltage V3. As a result, the accuracy of adjustment of the phase difference is enhanced and fluctuation of the spot size when the electron beam collides with the target 22 is suppressed, and this contributes to improvement of the accuracy of investigation.

It should be understood that a case in which the X-ray generation device 30 is built using the X-ray generation unit 2 explained above in connection with the second embodiment is also to be considered as being included as an aspect of the present invention. Since, in this case, it is possible to keep the spot size when the electron beam collides with the target 22 small, accordingly it is possible to enhance the resolution during investigation of the object S under investigation with the X-ray device 100.

The Fourth Embodiment

A fourth embodiment of the X-ray device according to the present invention will now be explained with reference to the drawings. In the following explanation, to structural elements that are the same as ones in the first embodiment, the same reference symbols will be appended, and the explanation will concentrate upon differences. What are not particularly explained are the same as in the first embodiment. This fourth embodiment is different from the first embodiment in that the X-ray generation unit comprises three high voltage power supply units.

Figure 8:
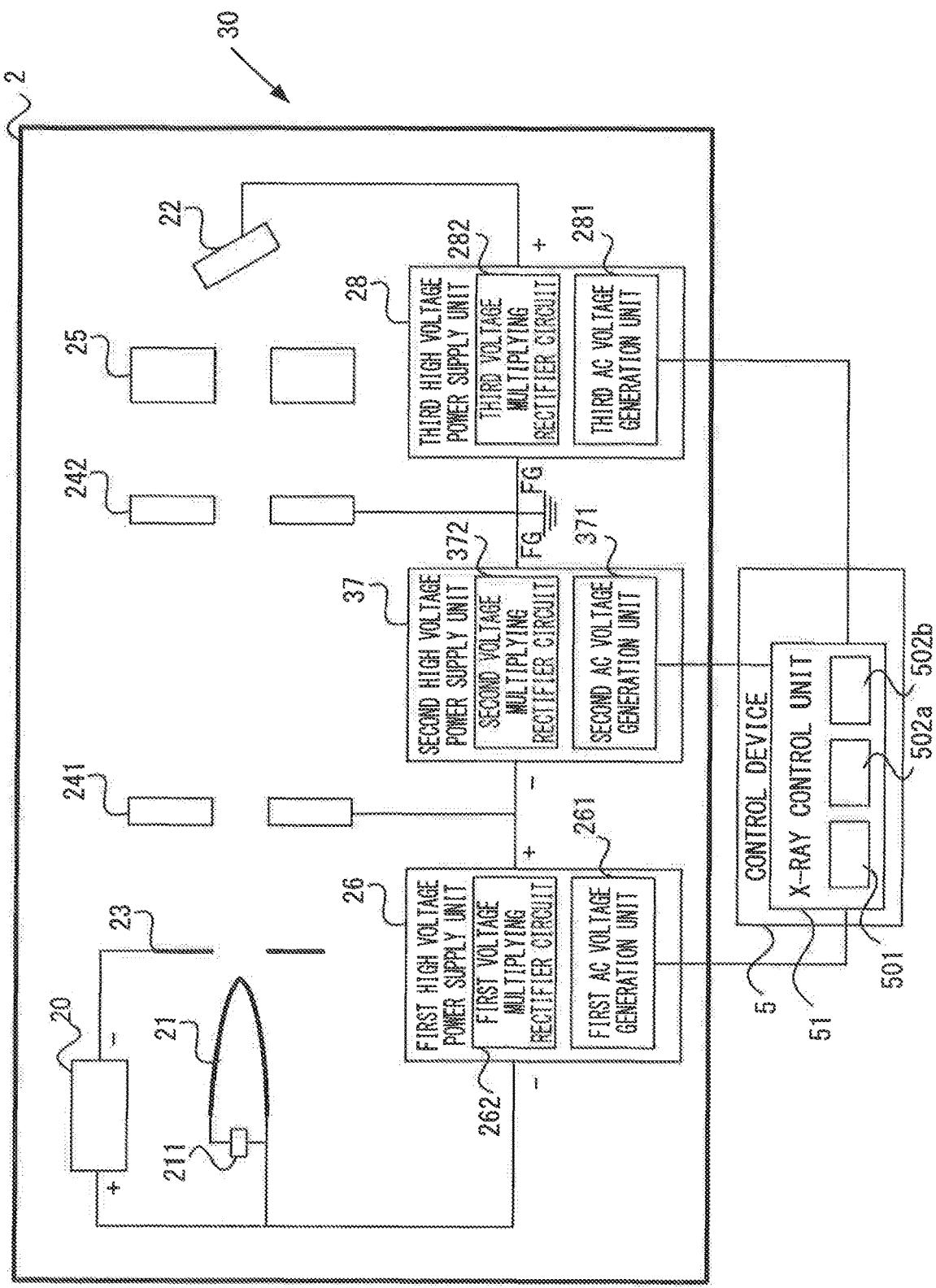
FIG. 8 is a figure showing the structure of an X-ray generation device according to a fourth embodiment.

FIG. 8 is a figure schematically showing the structure of an X-ray generation device 30 according to this fourth embodiment. As shown in FIG. 8, in the X-ray generation unit 2 of this fourth embodiment, a first intermediate electrode 241 and a second intermediate electrode 242 are provided instead of the intermediate electrode 24 of the first embodiment, and, in addition to the first high voltage power supply unit 26 and the second high voltage power supply unit 37 of the second embodiment, a third high voltage power supply unit 28 is provided in series therewith.

The first intermediate electrode 241 and the second intermediate electrode 242 are provided between the filament 21 and the electron optics member 25. The first intermediate electrode 241 is provided on the side toward the filament 21, while the second intermediate electrode 242 is provided on the side toward the electron optics member 25. The first high voltage power supply unit 26 is electrically connected to the filament 21 and to the first intermediate electrode 241, and supplies a negative voltage to the filament 21 with respect to the first intermediate electrode 241. This first high voltage power supply unit 26 is controlled by the X-ray control unit 51, and supplies a first high voltage V1 between the filament 21 and the first intermediate electrode 241. And the second high voltage power supply unit 37 is electrically connected to the first intermediate electrode 241 and to the second intermediate electrode 242, and supplies a positive voltage to the second intermediate electrode 242 with respect to the first intermediate electrode 241. This second high voltage power supply unit 37 is controlled by the X-ray control unit 51, and supplies a second high voltage V2 between the first intermediate electrode 241 and the second intermediate electrode 242. Moreover, the third high voltage power supply unit 28 is electrically connected to the second intermediate electrode 242 and to the target 22, and supplies a positive voltage to the target 22 with respect to the second intermediate electrode 242. This third high voltage power supply unit 28 is controlled by the X-ray control unit 51, and supplies a third high voltage V4 between the second intermediate to electrode 241 and the target 22.

Figure 9:
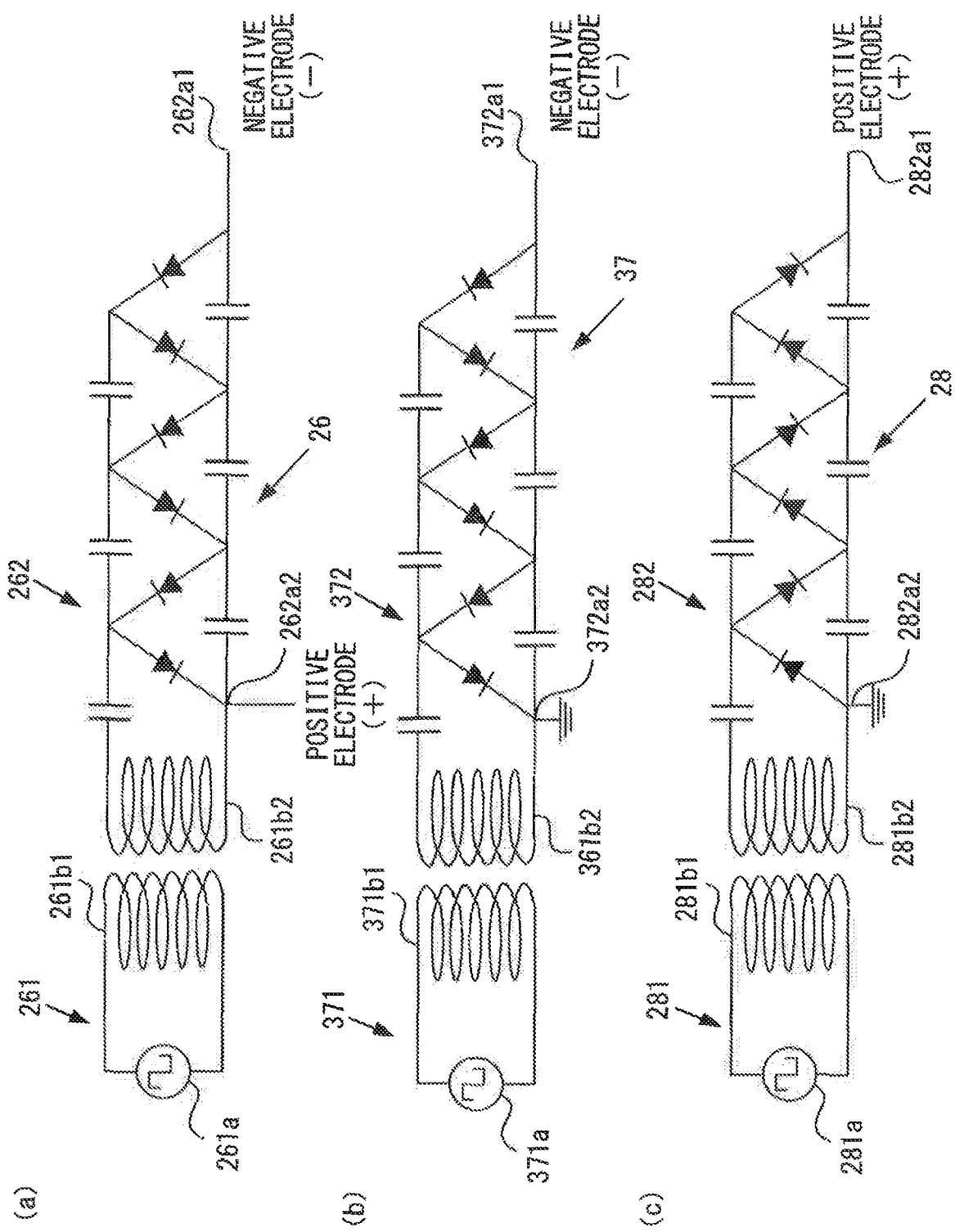
FIG. 9 consists of circuit diagrams for explanation of high voltage power supplies in the fourth embodiment.

The structures of the first high voltage power supply unit 26, the second high voltage supply unit 37, and the third high voltage power supply unit 28 will now be explained using the circuit diagrams shown in FIG. 9. FIG. 9($a$) is a structural circuit diagram for the first high voltage power supply unit 26, FIG. 9($b$) is a structural circuit diagram for the second high voltage power supply unit 37, and FIG. 9($c$) is a structural circuit diagram for the third high voltage power supply unit 28. The first high voltage power supply unit 26 and the second high voltage power supply unit 37 have similar circuit structures to the first high voltage power supply unit 26 and the second high voltage power supply unit 37 of the second embodiment shown in FIG. 6. And, in a similar manner to the case in the second embodiment, an output terminal 262$a$2 on the side of a secondary winding 261$b$2 of the first voltage multiplying rectifier circuit 262 is connected to the first intermediate electrode 241, while an output terminal 262$a$1 is connected to the filament 21. And a ground electrode 372$a$2 of the second voltage multiplying rectifier circuit 372 is connected to the second intermediate electrode 242, while an output terminal 372$a$1 thereof is connected to the first intermediate electrode 241. Accordingly, by the first voltage multiplying rectifier circuit 242 rectifying the AC voltage output from the first AC voltage generation unit 261 and boosting it by a predetermined magnification, the output terminal 262$a$1 is able to acquire a high negative voltage V1 with respect to the first intermediate electrode 241. And, by the second voltage multiplying rectifier circuit 372 rectifying the AC voltage output from the second AC voltage generation unit 371 and boosting it by a predetermined magnification, the second intermediate electrode 242 is able to acquire a high positive voltage V2 with respect to the first intermediate electrode 241.

Moreover, as shown in FIG. 9($c$), the third high voltage power supply unit 28 comprises a third AC voltage generation unit 281 and a third voltage multiplying rectifier circuit 282. The third AC voltage generation unit 281 has a similar structure to that of the first AC voltage generation unit 261. In other words, when the voltage of an AC power supply 281$a$ of the third AC voltage generation unit 281 is supplied to the primary winding 281$b$1 of a transformer, a voltage is generated between the two ends of a secondary winding 281$b$2 thereof. And the third voltage multiplying rectifier circuit 282 has the same circuit structure as the second voltage multiplying rectifier circuit 272 of the first embodiment. In detail, in this third voltage multiplying rectifier circuit 282, the polarities of the plurality of diodes are inverted with respect to the first voltage multiplying rectifier circuit 262. However, the ground electrode 282$a$2 of this third voltage multiplying rectifier circuit 282 is connected to the second intermediate electrode 242, while its output terminal 282$a$1 is connected to the target 22. Accordingly, by the third voltage multiplying rectifier circuit 382 rectifying the AC voltage output from the third AC voltage generation unit 381 and boosting it by a predetermined magnification, the target 22 is able to acquire a high positive voltage V3 with respect to the second intermediate electrode 242.

A reference clock signal generation unit 501 of the X-ray control unit 51 outputs control signals to the first AC voltage generation unit 261, to the second AC voltage generation unit 371, and to the third AC voltage generation unit 281, for causing output of pulse form AC voltages of the same period, corresponding to the period of a reference clock signal. The phase adjustment units 502a and 502b of the X-ray control unit 51 suppress generation of the fluctuation component L3 of the acceleration voltage V3 by delaying the phase of the AC voltages from two among the first AC voltage generation unit 261, the second AC voltage generation unit 371, and the third AC voltage generation unit 281. In this embodiment, as one example, a case will be explained in which the phases of the AC voltages produced by the second AC voltage generation unit 371 and by the third AC voltage generation unit 281 are delayed.

The phase adjustment unit 502a of the X-ray control unit 51 may delay the phase of the AC voltage from the second AC voltage generation unit 371 so that, for example, the phase difference between the AC voltage from the first AC voltage generation unit 261 and the AC voltage from the second AC voltage generation unit 371 becomes 120°. Moreover, the phase adjustment unit 502b may delay the phase of the AC voltage from the third AC voltage generation unit 281 so that, for example, the phase difference between the AC voltage from the second AC voltage generation unit 371 and the AC voltage from the third AC voltage generation unit 281 becomes 120°.

Figure 10:
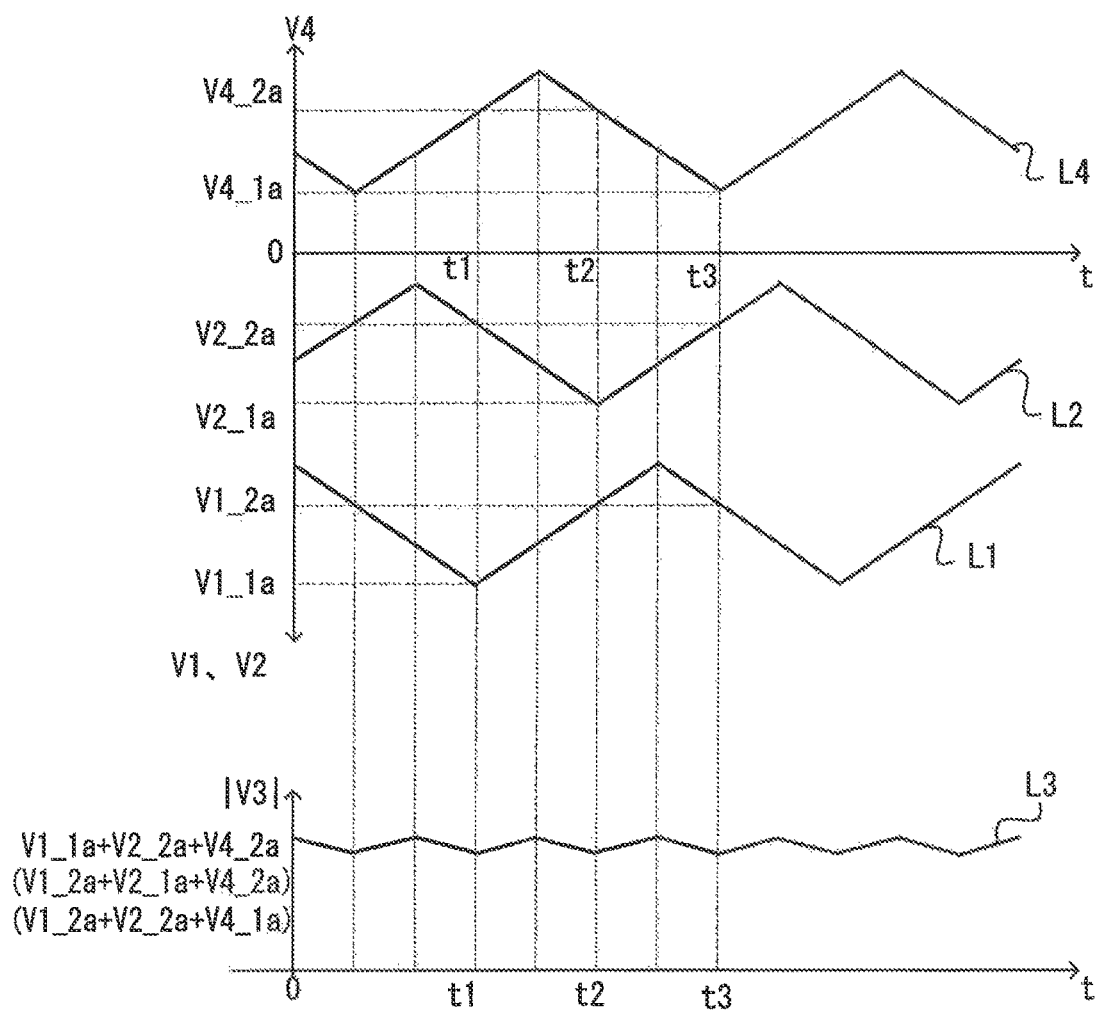
FIG. 10 is a figure relating to this fourth embodiment, for explanation of ripple components in voltages generated by first, second, and third voltage multiplying rectifier circuits, and for explanation of a fluctuation component in an acceleration voltage.

FIG. 10 schematically shows a state in which the fluctuation component of the acceleration voltage V3 is controlled. In FIG. 10, time t is shown along the horizontal axis, and the ripple component generated by the first voltage multiplying rectifier circuit 262 is denoted by L1, the ripple component generated by the second voltage multiplying rectifier circuit 372 is denoted by L2, the ripple component generated by the third voltage multiplying rectifier circuit 282 is denoted by IA, and the ripple component in the acceleration voltage V3 for accelerating the electron beam emitted from the filament 21 is denoted by L3.

As shown in FIG. 10, at the time point t1, with the position of the second intermediate electrode 242 being taken as ground, the potential difference from ground of the ripple component L1 is V1_1a, the potential difference from ground of the ripple component L2 is V2_2a, and the potential difference from ground of the ripple component L4 is V4_2a. Due to this, the ripple component L3 of the acceleration voltage V3 at the time point t1 becomes (V1_1a+V2_2a+V4_2a). It should be understood that, in connection with the potential differences of FIG. 8, "1a" as an index is included in the label for the electrical potential at peak of each of the fluctuation components, while "2a" as an index is included in the label for the electrical potential of each of the fluctuation components in the state when its phase is 120° from peak.

At the time point t2 when the phase has changed by 120° of a cycle from that at the time point t1, the potential difference of the ripple component L1 is V1_2a, the potential difference of the ripple component L2 is V2_1a, and the potential difference of the ripple component L4A is V4_2a. Due to this, the ripple component L3 of the acceleration voltage V3 at the time point t2 is (V1_2a+V2_1a+V4_2a). And, at the time point t3 when the phase has changed by 120° of a cycle from that at the time point t2, the potential difference of the ripple component L is V1_2a, the potential difference of the ripple component L2 is V2_2a, and the potential difference of the ripple component L4 is V4_1a. Due to this, the ripple component L3 of the acceleration voltage V3 at the time point t3 is (V1_2a+V2_2a+V4_1a).

At the time points t1, t2, and t3, the electrical potential of one of the ripple components L1, L2, and L3 is at peak, while the electrical potentials of the other two are in states in which their phases are 120° away from peak. Due to this, the electrical potentials of the ripple component L3 of the acceleration voltage V3 between the filament 21 and the target 22 at the time points t1, t2, and t3 are respectively (V1_1a+V2_2a+V4_2a), (V1_2a+V2_1a+V4_2a), and (V1_2a+V2_2a+V4_1a), i.e. are substantially the same. It should be understood that, at timings that are different from the time points t1, t2, and t3 mentioned above, some fluctuation in the potential difference between the filament 21 and the target 22 does occur. However, if the ripple components generated by the first high voltage power supply unit 26, the second high voltage power supply unit 37, and the third high voltage power supply unit 28 are equal, then the amplitude of this ripple component can be suppressed to be ⅓ of the amplitude of the ripple components generated by those high voltage power supply units. Thus since, as a result, the electron beam is accelerated with almost no fluctuations due to the acceleration voltage V3, accordingly X-rays are emitted from the X-ray generation unit 2 in a state in which fluctuations of the amount of aberration of the electron beam due to the electron optics member are suppressed, and fluctuations of the spot size are suppressed.

With the X-ray generation device 30 according to the fourth embodiment described above, in addition to the beneficial operational effects obtained with the first embodiment, the following further beneficial operational effects are obtained.

The first intermediate electrode 241 is disposed between the filament 21 and the target 2, and the second intermediate electrode 242 is disposed between the first intermediate electrode 241 and the target 22. The first high voltage power supply 26 supplies the first high voltage V1 between the filament 21 and the first intermediate electrode 241, the second high voltage power supply 37 supplies the second high voltage V2 between the first intermediate electrode 241 and the second intermediate electrode 242, and the third high voltage power supply 28 supplies the third high voltage V4 between the second intermediate electrode 242 and the target 22. And the X-ray control unit 51 performs control so that two of the phase of the ripple component L1 of the first high voltage V1 output from the first high voltage power supply 26, the phase of the ripple component L2 of the second high voltage V2 output from the second high voltage power supply 37, and the phase of the ripple component LA of the third high voltage V4 output from the third high voltage power supply 28, are substantially 120° apart. Accordingly, also for a case in which the number of high voltage power supplies is increased with the objective of increasing the acceleration of the electron beam, X-rays are emitted from the X-ray generation unit 2 in a state in which generation of a fluctuation component L3 in the acceleration voltage V3 is suppressed, and thereby fluctuations of the spot size are suppressed. Therefore, it is possible to suppress fluctuations of the resolution of the projected images when X-rays emitted from the target are acquired by the detector 4, so that it is possible to maintain the accuracy of investigation of the object under investigation.

It should be understood that a case in which four or more high voltage power supply units are provided is also to be considered as being included as an aspect of the present invention. If n high voltage power supply units are provided (where n is an integer ≥4), then the X-ray control unit 51 should perform adjustment so that the phases of (n−1) of these high voltage power supply units are spaced apart from one another by intervals of just (360°/n).

Furthermore, it would also be acceptable to arrange to control the phase of each of the high voltage power supplies by using an image produced by photographing a test piece TP, in a similar manner to the case with the third embodiment. In other words, it would be acceptable to adjust at least two of the first high voltage power supply unit 26, the second high voltage power supply unit 37, and the third high voltage power supply unit 28, while checking upon the fluctuation component L3 that is generated in the acceleration voltage V3. As a result, the accuracy of adjustment of the phase differences is enhanced, and this contributes to the accuracy of investigation by suppressing fluctuations of the spot size when the electron beam collides with the target 22.

The Fifth Embodiment

A structure manufacturing system according to a fifth embodiment of the present invention will now be explained with reference to the drawings. The structure manufacturing system of this fifth embodiment may manufacture, for example, a molding such as a door portion, an engine portion, a gear portion, or an electronic component incorporating a circuit board or the like of the automobile.

Figure 11:
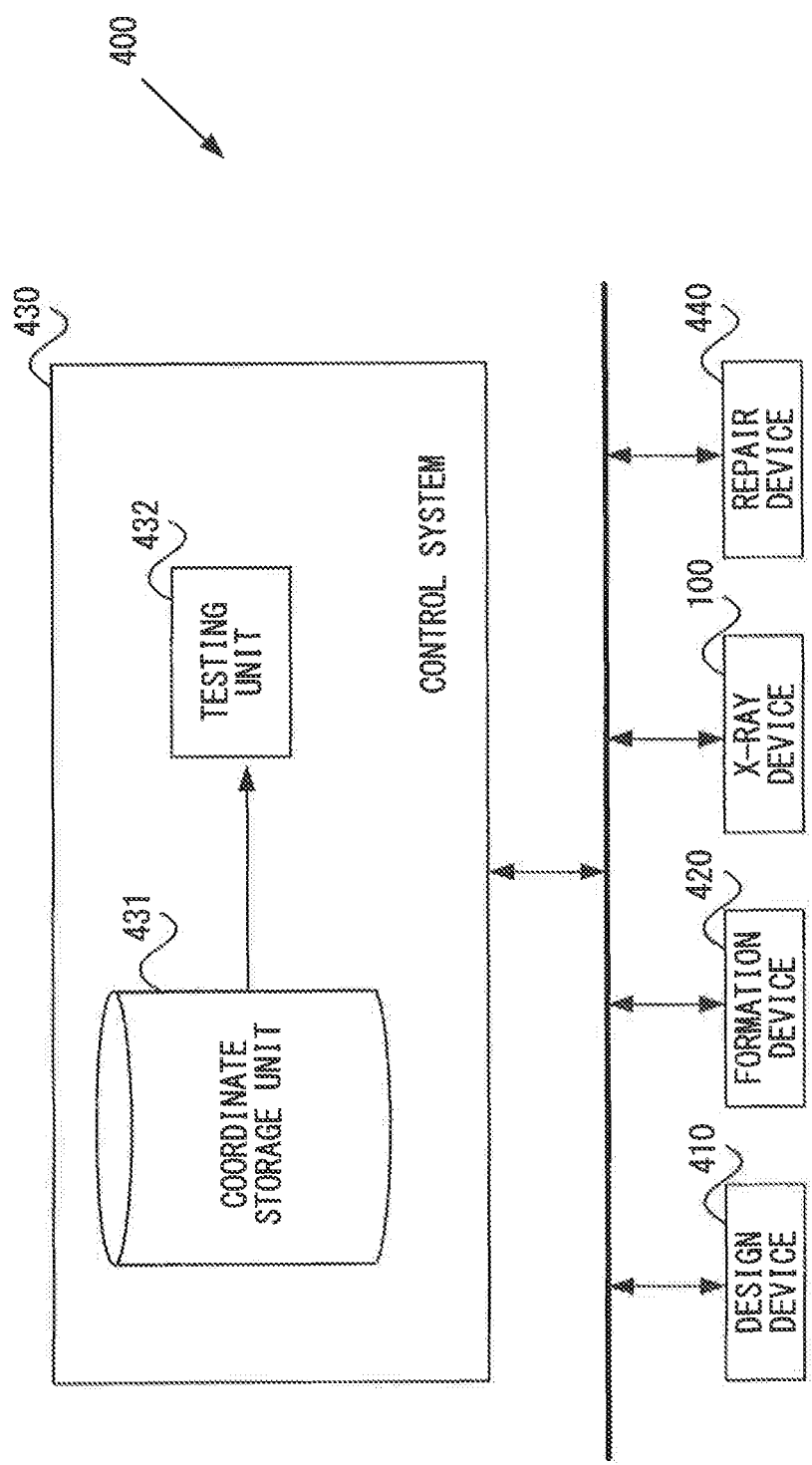
FIG. 11 is a figure for explanation of the construction of a structure manufacturing system according to a fifth embodiment.

FIG. 11 is a block diagram showing an example of the construction of a structure manufacturing system 400 according to this fifth embodiment. This structure manufacturing system 400 comprises an X-ray device 100 as explained in connection with the first through the fourth embodiment of the present invention, a design device 410, a formation device 420, a control system 430, and a repair device 440.

The design device 410 performs design processing in order to create design information related to the shape of a structure. This design information is information specifying the coordinates of various positions upon the structure. The design information is output to a formation device 420 and a control system 430 that will be described hereinafter. Using the design information that has been created by the design device 410, the formation device 420 performs molding processing to manufacture the structure by molding. In this case, any system in which the formation device 420 performs at least one of casting, forging, and cutting is to be considered as being an aspect of the present invention.

The X-ray device 100 performs investigation processing for investigating the shape of the structure that has been molded by the formation device 420. And the X-ray device 100 outputs to the control system 430 information related to coordinates of the structure (hereinafter referred to as "shape information"), which is the result of investigating the structure. The control system 430 comprises a coordinate storage unit 431 and a testing unit 432. And a coordinate storage unit 431 stores the design information created by the design device 410 described above.

The testing unit 432 makes a determination as to whether or not the structure that has been molded by the formation device 420 has been molded according to the design information created by the design device 410. To put it in another manner, the testing unit 432 makes a determination as to whether or not the structure that has been molded is a good product. In this case, the testing unit 432 reads out the design information stored in the coordinate storage unit 431, and performs testing processing in order to compare this design information with the shape information that has been input from the X-ray device 100. As this testing processing, for example, the testing unit 432 may compare the coordinates specified in the design information with the corresponding coordinates specified in the shape information, and, if the result of the testing processing is that the coordinates in the design information and the coordinates in the shape information agree with one another, then it is determined that this is a good product that has been molded properly according to the design information. But, if the coordinates in the design information and the corresponding coordinates in the shape information do not agree with one another, then the testing unit 432 determines whether or not the differences between the coordinates are within a predetermined range, and determines that this is a poor product that nevertheless can be repaired if the differences are within the predetermined range.

If it has been determined that this is a poor product that can be repaired, then the testing unit 432 outputs repair information to a repair device 440, specifying the portions that are poor and the amount of repairing required. The poor portions are coordinates of the items of shape information that do not agree with the corresponding coordinates in the design information, and the amount of repairing that is required is the difference between the coordinates of the design information at the poor portions and the coordinates in the shape information. On the basis of this repair information that has been input, the repair device 440 performs repair processing in order to re-process the poor portions on the structure. And, in this repair processing, the repair device 440 again performs, for a second time, similar processing to the molding processing performed by the formation device 420.

Figure 12:
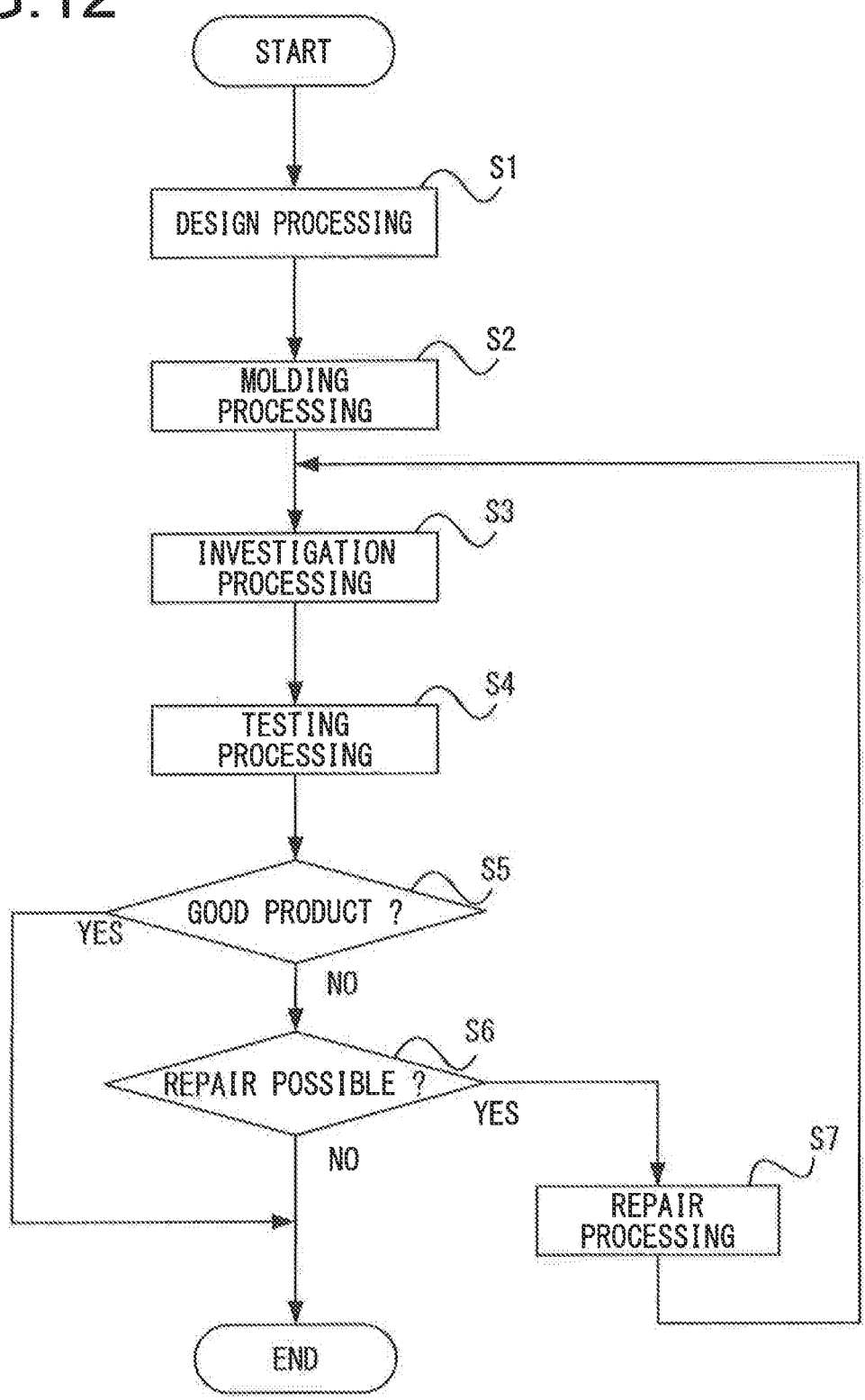
FIG. 12 is a flow chart for explanation of processing performed by a structure manufacturing system.

The processing performed by this structure manufacturing system 400 will now be explained with reference to the flow chart shown in FIG. 12.

In step S1, by performing design processing, the design device 410 creates design information related to the shape of the structure, and then the flow of control proceeds to step S2. In step S2, the formation device 420 molds and manufactures the structure on the basis of the design information by molding processing, and then the flow of control proceeds to step S3. In step S3, the X-ray device 100 performs investigation processing so as to investigate the shape of the structure and outputs shape information, and then the flow of control proceeds to step S4.

In step S4, the testing unit 432 performs testing processing by comparing the design information that was created by the design device 410 with the shape information that was investigated and output by the X-ray device 100, and then the flow of control proceeds to step S5. In step S5, on the basis of the result of testing processing, the testing unit 432 makes a decision as to whether or not the structure that has been molded by the formation device 420 is a good product. If this structure is a good product, in other words if the coordinates in the design information and the coordinates in the shape information agree with one another, then an affirmative decision is reached in the step S5 and this processing terminates. But if this structure is not a good product, in other words if the coordinates in the design information and the coordinates in the shape information do not agree with one another, then a negative decision is reached in step S5 and the flow of control proceeds to step S6.

In step S6, the testing unit 432 makes a decision as to whether or not the poor portions upon the structure can be repaired. If the poor portions cannot be repaired, in other words if the difference at the poor portions between the coordinates in the design information and the coordinates in the shape information is outside the predetermined range, then a negative decision is reached in this step S6 and this processing terminates. But if the poor portions can be repaired, in other words if the difference at the poor portions between the coordinates in the design information and the coordinates in the shape information is within the predetermined range, then an affirmative decision is reached in this step S6 and the flow of control proceeds to step S7. In this case, the testing unit 432 outputs repair information to the repair device 440. And in step S7 the repair device 440 performs repair processing upon the structure on the basis of this repair information that has been input, and then the flow of control returns to step S3. It should be understood that in this repair processing, as described above, the repair device 440 again performs similar processing to the molding processing performed by the formation device 420.

The following beneficial operational effects are obtained with the structure manufacturing system 400 according to the fifth embodiment of the present invention as explained above.

(1) The X-ray device 100 performs investigation processing for acquiring shape information relating to the structure that has been built by the formation device 420 on the basis of the design processing performed by the design device 410, and the testing unit 432 of the control system 430 performs testing processing by comparing the shape information that has been acquired by this investigation processing with the design information that was created by the design processing. Thus, since it is possible to determine whether or not this structure that has been manufactured by using the design information is a good product by performing testing for defects of the structure and by acquiring information related to the interior of the structure by non-destructive testing, accordingly this makes a contribution to management of product quality of the structure.

(2) On the basis of the results of comparison during the testing processing, it is arranged for the repair device 440 to perform repair processing by again performing molding processing upon the structure. Thus since it is possible to perform similar processing to re-molding processing upon the structure for a second time if the poor portions of the structure can be repaired, accordingly this contributes to manufacture of a structure of high product quality that is close to the design information.

The variations described below are also to be considered as coming within the range of the present invention; and it would also be possible to combine one or a plurality of the following variant embodiments with one or a plurality of the embodiments described above.

(1) A system in which it is arranged for the output voltage of the first high voltage power supply unit 26 and/or the second high voltage power supply unit 27 or 37 to be variable is also to be considered as being one aspect of the present invention. In this case, in the circuit diagram shown in FIG. 3, the voltage generated in the secondary winding 261b2 may be made to be variable by providing a structure in which a voltage supplied to an intermediate point of the primary winding 261b1 is variable. As a result, it becomes possible to make the voltage output from the first voltage multiplying rectifier circuit 262 be variable.

(2) The ripple waveform is not to be considered as being limited to being like a triangular wave. In particular, if the period of the high voltage generation unit is adjusted according to the charge and discharge times of the capacitors, then, although it is possible to obtain high voltage electrical power that can be acquired at high efficiency by the voltage multiplying rectifier circuit, at this time the ripple waveform becomes like a triangular wave. However, if the high voltage power supply unit is built to produce AC voltage whose period is longer than the charge and discharge times, then a ripple component having a trapezoidal shape is generated. Even in a case in which such a ripple component is generated, still it is possible, by applying the present invention, to suppress the occurrence of a fluctuation component in the acceleration voltage between the filament 21 and the target 22.

(3) A system in which, instead of the stage 31 being shifted, the stage 31 is fixed and the X-ray generation unit 2 and the detector 4 are shifted, is also to be considered as being one aspect of the present invention. In other words, it is sufficient for the X-ray generation unit 2 and the detector 4 to be shifted in the X axis direction, the Y axis direction, and the Z axis direction with respect to the object S that is to be investigated. Moreover it would also be acceptable, instead of making the stage 31 to be rotatable around the rotational axis Yr as a center, to make the X-ray generation unit 2 and the detector 4 be rotatable with respect to the stage 31, in other words to make them be rotatable around the rotational axis Yr as a center.

The present invention should not be considered as being limited to the embodiments described above; provided that the essential characteristics of the present invention are not departed from, other forms thereof that are considered to come within the range of the technical concept of the present invention are also included within the scope of the present invention.

REFERENCE SIGNS LIST

2: X-ray generation unit; 4: detector; 5: control device; 21: filament; 22: target; 24: intermediate electrode; 25: electron optics member; 26: first high voltage power supply unit; 27, 37: second high voltage power supply unit; 28: third high voltage power supply unit; 30: X-ray generation device; 51: X-ray control unit; 53: image generation unit; 54: image reconstruction unit; 55: image evaluation unit; 241: first intermediate electrode; 242: second intermediate electrode; 261: first AC voltage generation unit; 262: first voltage multiplying rectifier circuit; 271, 371: second AC voltage generation unit; 272, 372: second voltage multiplying rectifier circuit; 281: third AC voltage generation unit; 282: third voltage multiplying rectifier circuit; 400: structure manufacturing system; 410: design device; 420: formation device; 430: control system; 432: testing unit; 440: repair device.

The invention claimed is:

1. An X-ray generation device that emits X-rays due to an electron beam emitted from a cathode arriving at a target, comprising:
first and second high voltage power supplies that are connected in series between the cathode and the target, and both of which accelerate the electron beam;
an intermediate electrode that is disposed between the cathode and the target; and
a phase adjustment unit that controls at least one of the first high voltage power supply and the second high voltage power supply, so that a phase of a ripple component of a first high voltage output from the first high voltage power supply and a phase of a ripple component of a second high voltage output from the second high voltage power supply have a predetermined relationship; wherein the first high voltage power supply supplies the first high voltage between the cathode and the intermediate electrode; and the second high voltage power supply supplies the second high voltage between the intermediate electrode and the target.

2. The X-ray generation device according to claim 1, wherein:

a period of the ripple component of the first high voltage and a period of the ripple component of the second high voltage are almost the same; and the phase adjustment unit controls at least one of the first high voltage power supply and the second high voltage power supply, so that the phase of the ripple component of the first high voltage and the phase of the ripple component of the second high voltage are substantially 180° apart.

3. The X-ray generation device according to claim 1, wherein:

each of the first high voltage power supply and the second high voltage power supply comprises an AC voltage generation unit and a voltage multiplying rectifier circuit that generates the first high voltage or the second high voltage respectively as a predetermined multiple of the voltage output by the respective AC voltage generation unit; and the AC voltage generation units generate AC voltages of predetermined periods based upon control signals output from the phase adjustment unit.

4. The X-ray generation device according to claim 3, wherein each of the voltage multiplying rectifier circuits comprises a plurality of electrostatic capacitor elements.

5. The X-ray generation device according to claim 1, further comprising an electron beam converging unit that is disposed between the intermediate electrode and the target.

6. The X-ray generation device according to claim 1, further comprising a detector that detects X-rays emitted from the target; and wherein the phase adjustment unit controls at least one of the first high voltage power supply and the second high voltage power supply based upon the detection output of the detector.

7. An X-ray device comprising:

the X-ray generation device according to claim 1;

a detector that detects X-rays that are emitted from the X-ray generation device and that pass through an object under investigation; and a shifting unit that shifts the X-ray generation device and the detector relatively with respect to the object under investigation.

8. The X-ray device according to claim 7, further comprising a reconstruction unit that, in a state in which positions of the X-ray generation device and the detector with respect to the object under investigation are different, generates internal structure information for the object under investigation based upon a plurality of items of projection data detected by the detector.

9. The X-ray device according to claim 1, wherein the phase adjustment unit controls the phase of the ripple component of the second high voltage with respect to the phase of the ripple component of the first high voltage.

10. The X-ray device according to claim 9, wherein each of the first high voltage power supply and the second high voltage power supply comprises;

an AC voltage generation unit and a voltage multiplying rectifier circuit that generates the first high voltage or the second high voltage respectively as a predetermined multiple of the voltage output by the respective AC voltage generation unit; and the phase adjustment unit controls AC voltage input to at least one of the first high voltage power supply and the second power supply.

11. The X-ray device according to claim 9, wherein an electrical potential on a positive side of the first high voltage power supply is lower than an electrical potential on a positive side of the second high voltage power supply.

12. An X-ray generation device that emits X-rays due to an electron beam emitted from a cathode arriving at a target, comprising:

a first intermediate electrode disposed between the cathode and the target;

a first high voltage power supply that supplies a first high voltage between the cathode and the first intermediate electrode;

a second intermediate electrode disposed between the first intermediate electrode and the target;

a second high voltage power supply that supplies a second high voltage between the first intermediate electrode and the second intermediate electrode;

a third high voltage power supply that supplies a third high voltage between the second intermediate electrode and the target; and a phase adjustment unit that controls at least two of the first high voltage power supply, the second high voltage power supply, and the third high voltage power supply, so that a phase of a ripple component of the first high voltage output from the first high voltage power supply, a phase of a ripple component of the second high voltage output from the second high voltage power supply, and a phase of a ripple component of the third high voltage output from the third high voltage power supply have a predetermined relationship.

13. The X-ray generation device according to claim 12, wherein:

a period of the ripple component of the first high voltage, a period of the ripple component of the second high voltage, and a period of the ripple component of the third high voltage are almost the same; and the phase adjustment unit controls at least two of the first high voltage power supply, the second high voltage power supply, and the third high voltage power supply, so that the phase of the ripple component of the first high voltage and the phase of the ripple component of the second high voltage are substantially 120° apart, and the phase of the ripple component of the second high voltage and the phase of the ripple component of the third high voltage are substantially 120° apart.

14. The X-ray generation device according to claim 13, wherein:

each of the first high voltage power supply, the second high voltage power supply, and the third high voltage power supply comprises an AC voltage generation unit and a voltage multiplying rectifier circuit that generates the first high voltage, the second high voltage, or the third high voltage respectively as a predetermined multiple of the voltage output by the respective AC voltage generation unit; and the AC voltage generation units generate AC voltages of predetermined periods based upon control signals output from the phase adjustment unit.

15. The X-ray generation device according to claim 13, further comprising
a detector that detects X-rays emitted from the target; and wherein
the phase adjustment unit controls at least two of the first high voltage power supply, the second high voltage power supply, and the third high voltage power supply, based upon the detection output of the detector.

16. The X-ray generation device according to claim 12, wherein:
each of the first high voltage power supply, the second high voltage power supply, and the third high voltage power supply comprises an AC voltage generation unit and a voltage multiplying rectifier circuit that generates the first high voltage, the second high voltage, or the third high voltage respectively as a predetermined multiple of the voltage output by the respective AC voltage generation unit; and
the AC voltage generation units generate AC voltages of predetermined periods based upon control signals output from the phase adjustment unit.

17. The X-ray generation device according to claim 16, wherein
each of the voltage multiplying rectifier circuits comprises a plurality of electrostatic capacitor elements.

18. The X-ray generation device according to claim 12, further comprising
a detector that detects X-rays emitted from the target; and wherein
the phase adjustment unit controls at least two of the first high voltage power supply, the second high voltage power supply, and the third high voltage power supply, based upon the detection output of the detector.

19. An X-ray device comprising:
the X-ray generation device according to claim 12;
a detector that detects X-rays that are emitted from the X-ray generation device and that pass through an object under investigation; and
a shifting unit that shifts the X-ray generation device and the detector relatively with respect to the object under investigation.

20. An X-ray device that emits X-ray due to an electron beam emitted from a cathode arriving at a target, comprising:
first and second high voltage power supplies that are connected in series between the cathode and the target, and both of which accelerate the electron beam;
a first intermediate electrode that is disposed between the cathode and the target;
a second intermediate electrode that is disposed between the first intermediate electrode and the target; and
a phase adjustment unit that controls at least one of the first high voltage power supply and the second high voltage power supply, so that a phase of a ripple component of a first high voltage output from the first high voltage power supply and a phase of a ripple component of a second high voltage output from the second high voltage power supply have a predetermined relationship; wherein the first high voltage power supply supplies the first high voltage between the cathode and the first intermediate electrode; and
the second high voltage power supply supplies the second high voltage between the first intermediate electrode and the second intermediate electrode.

21. The X-ray generation device according to claim 20, wherein:
a period of the ripple component of the first high voltage and a period of the ripple component of the second high voltage are almost the same; and
the phase adjustment unit controls at least one of the first high voltage power supply and the second high voltage power supply, so that the phase of the ripple component of the first high voltage and the phase of the ripple component of the second high voltage are substantially 180° apart.

22. The X-ray generation device according to claim 20, wherein:
each of the first high voltage power supply and the second high voltage power supply comprises an AC voltage generation unit and a voltage multiplying rectifier circuit that generates the first high voltage or the second high voltage respectively as a predetermined multiple of the voltage output by the respective AC voltage generation unit; and
the AC voltage generation units generate AC voltages of predetermined periods based upon control signals output from the phase adjustment unit.

23. The X-ray generation device according to claim 22, wherein
each of the voltage multiplying rectifier circuits comprises a plurality of electrostatic capacitor elements.

24. The X-ray generation device according to claim 20, further comprising:
the second high voltage power supply is connected between the first high voltage power supply and the target.

25. The X-ray generation device according to claim 20, further comprising
an electron beam converging unit that is disposed between the second intermediate electrode and the target.

26. The X-ray generation device according to claim 20, further comprising
a detector that detects X-rays emitted from the target; and wherein
the phase adjustment unit controls at least one of the first high voltage power supply and the second high voltage power supply based upon the detection output of the detector.

27. The X-ray device according to claim 20, further comprising
a third high voltage power supply that supplies a third high voltage between the first intermediate electrode and the target; and wherein
the phase adjustment unit controls a phase of ripple component of the third high voltage with respect to the phase of ripple component of the third high voltage or the phase of ripple component of the second high voltage.

28. An X-ray device comprising:
the X-ray generation device according to claim 20;
a detector that detects X-rays that are emitted from the X-ray generation device and that pass through an object under investigation; and a shifting unit that shifts the X-ray generation device and the detector relatively with respect to the object under investigation.

\* \* \* \* \*

UNITED STATES PATENT AND TRADEMARK OFFICE
CERTIFICATE OF CORRECTION

PATENT NO. : 10,645,788 B2
APPLICATION NO. : 15/129677
DATED : May 5, 2020
INVENTOR(S) : Endo et al.

Page 1 of 1

It is certified that error appears in the above-identified patent and that said Letters Patent is hereby corrected as shown below:

In the Claims

In Claim 10, Column 26, Line 8, "comprises;" should read --comprises:--.

In Claim 20, Column 27, Line 50, "emits X-ray" should read --emits X-rays--.

Signed and Sealed this
First Day of December, 2020

Andrei Iancu
*Director of the United States Patent and Trademark Office*